Oct. 4, 1932. J. R. PEIRCE 1,880,472
PERFORATING MACHINE
Filed Dec. 3, 1927 24 Sheets-Sheet 6

Inventor
John Royden Peirce
By his Attorney

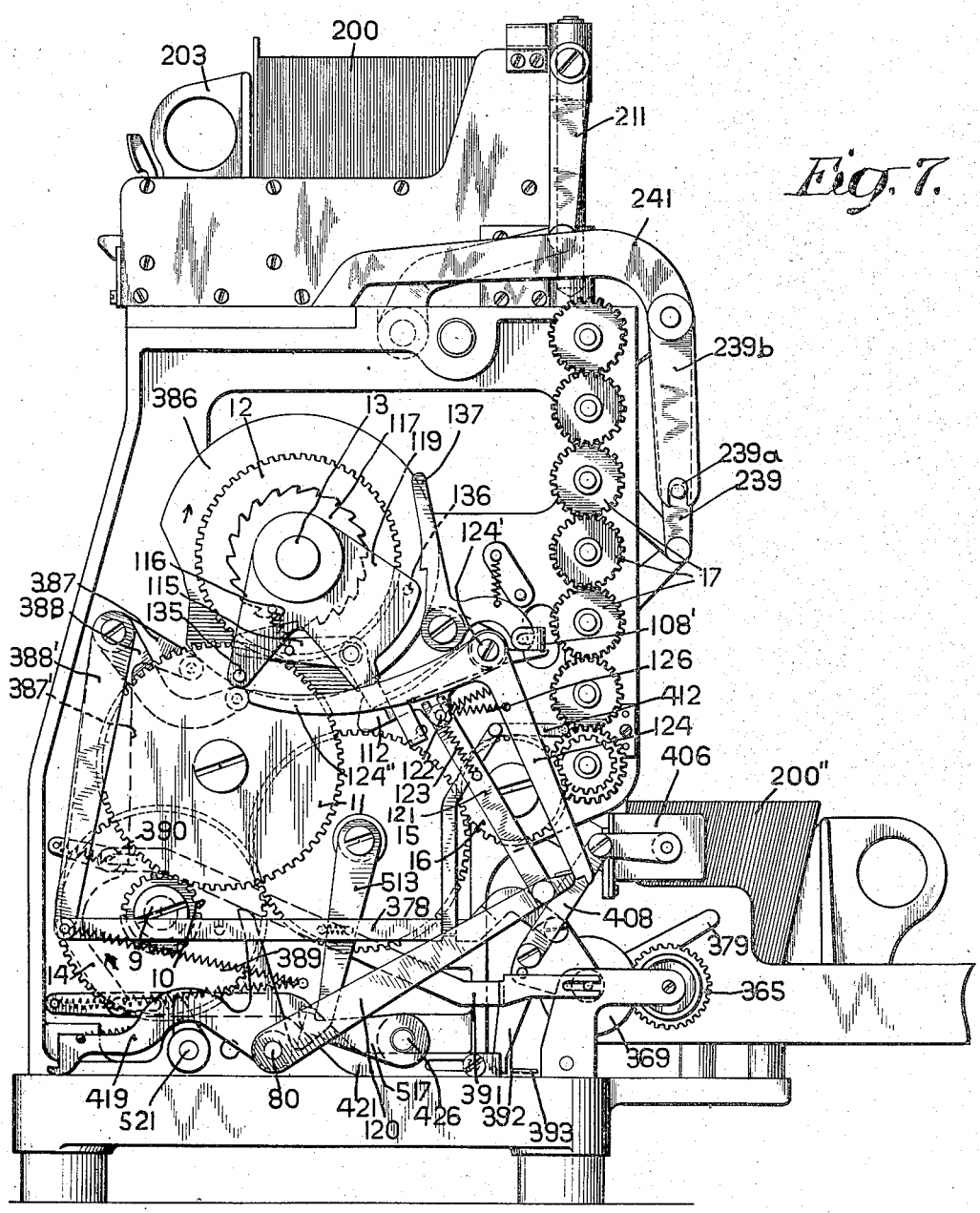

Oct. 4, 1932. J. R. PEIRCE 1,880,472
PERFORATING MACHINE
Filed Dec. 3, 1927 24 Sheets-Sheet 8
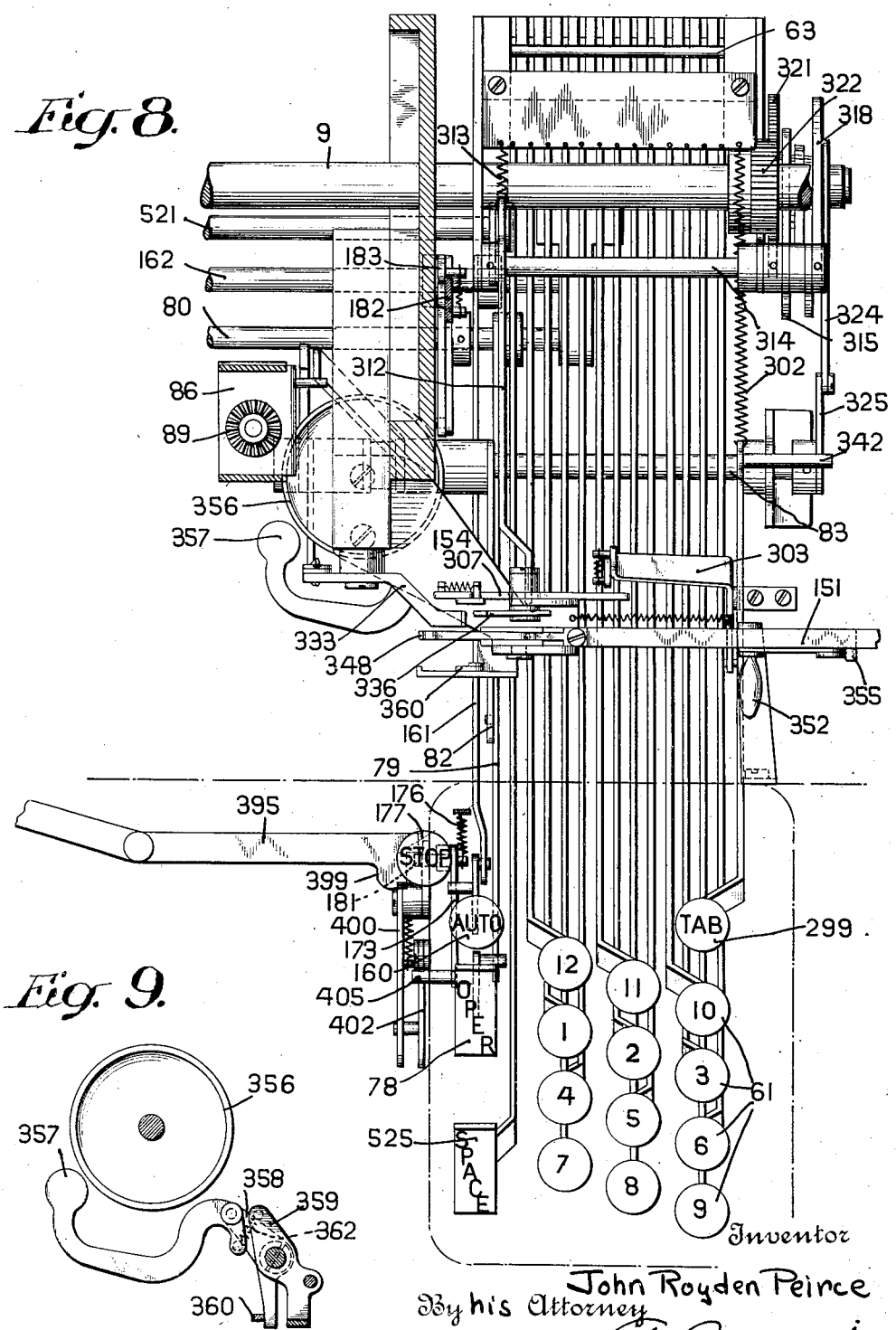

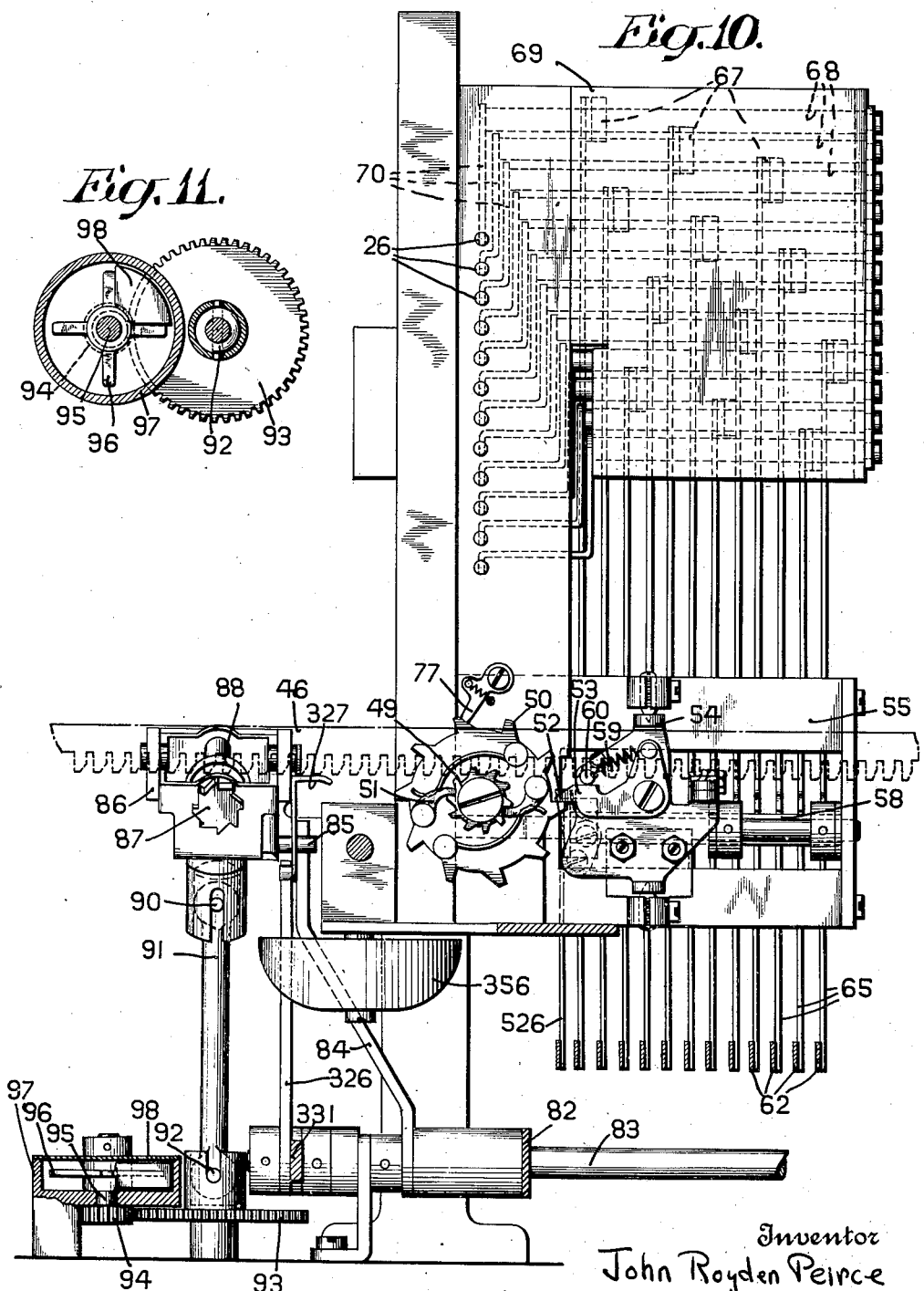

Oct. 4, 1932.                J. R. PEIRCE                1,880,472
                          PERFORATING MACHINE
                     Filed Dec. 3, 1927      24 Sheets-Sheet 10

Inventor
John Royden Peirce
By his Attorney

Oct. 4, 1932.   J. R. PEIRCE   1,880,472
PERFORATING MACHINE
Filed Dec. 3, 1927   24 Sheets-Sheet 11
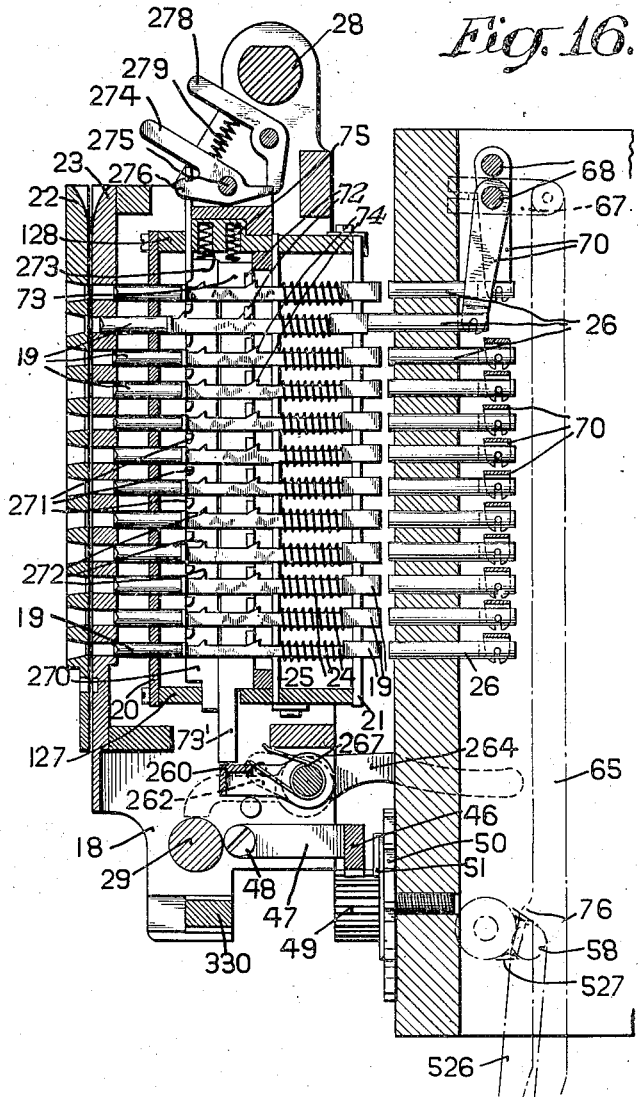
Fig. 16.
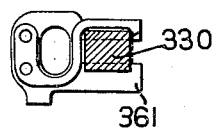
Fig. 17.
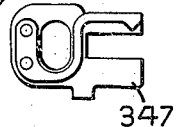
Fig. 18.
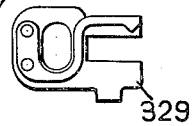
Fig. 19.
Fig. 20.
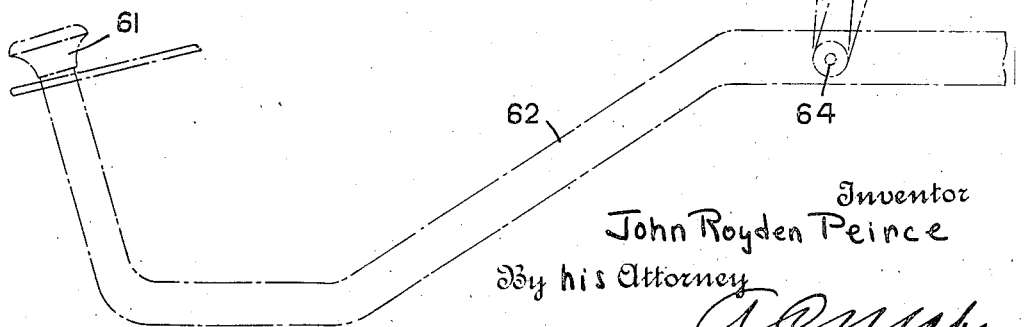
Inventor
John Royden Peirce
By his Attorney

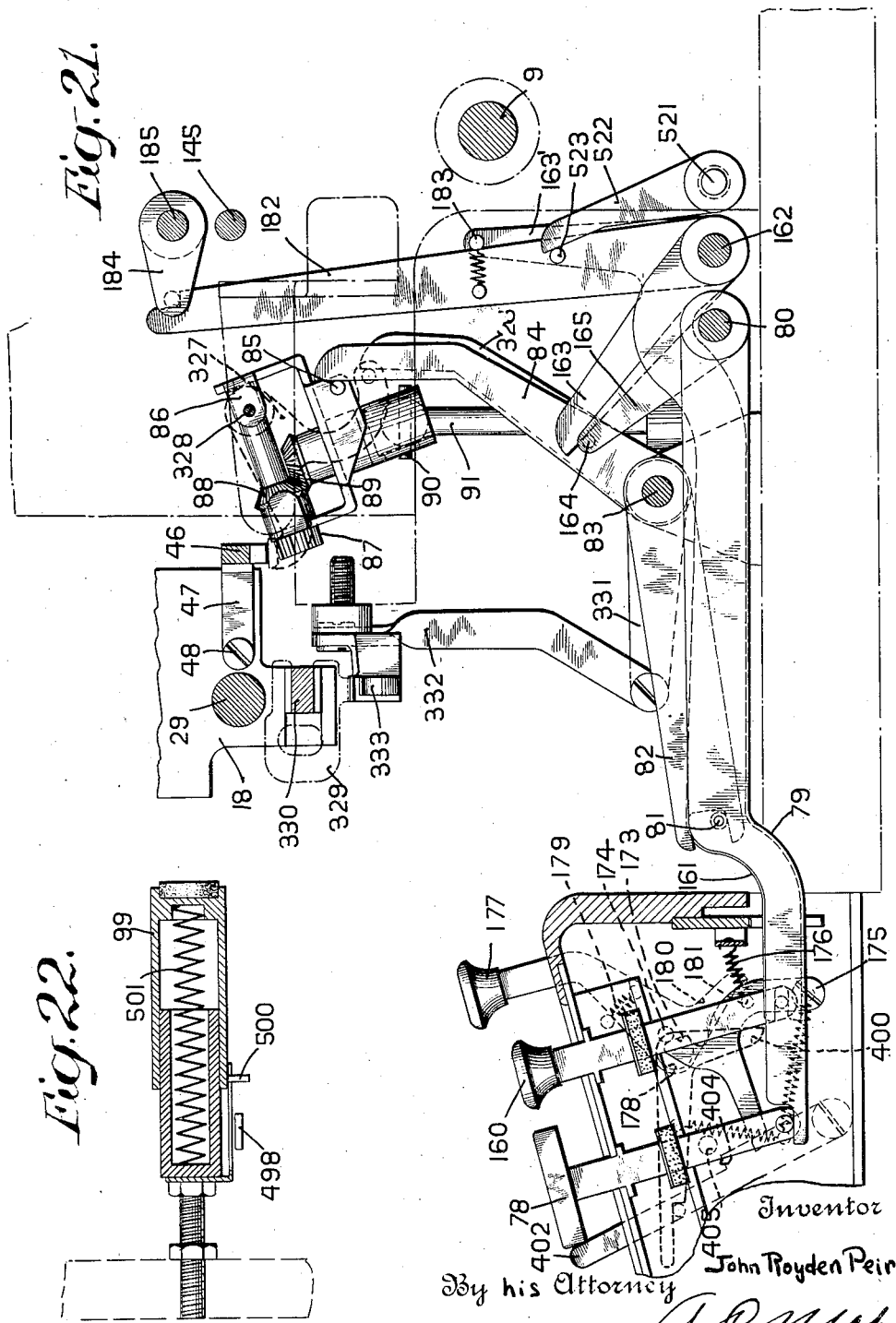

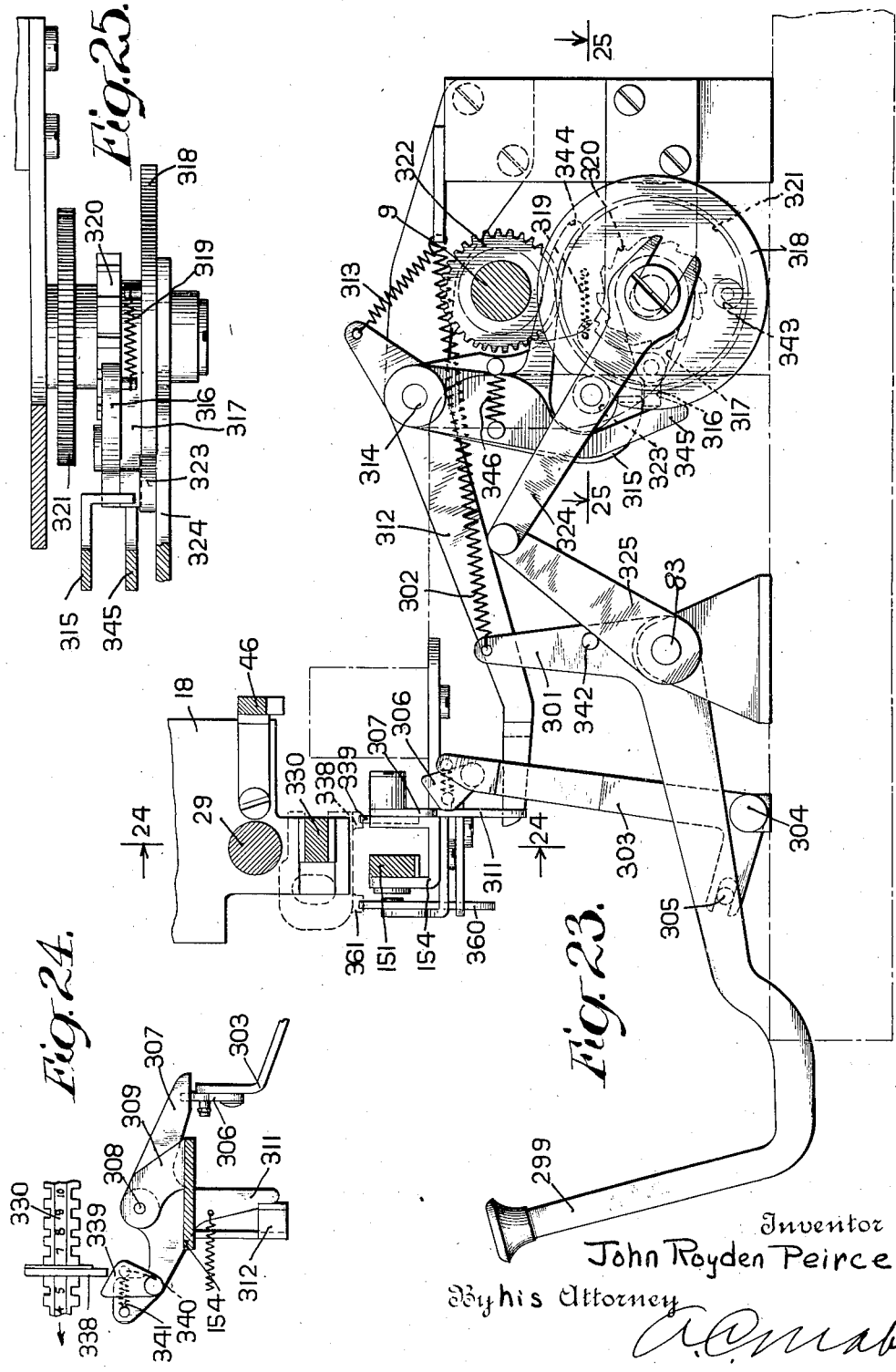

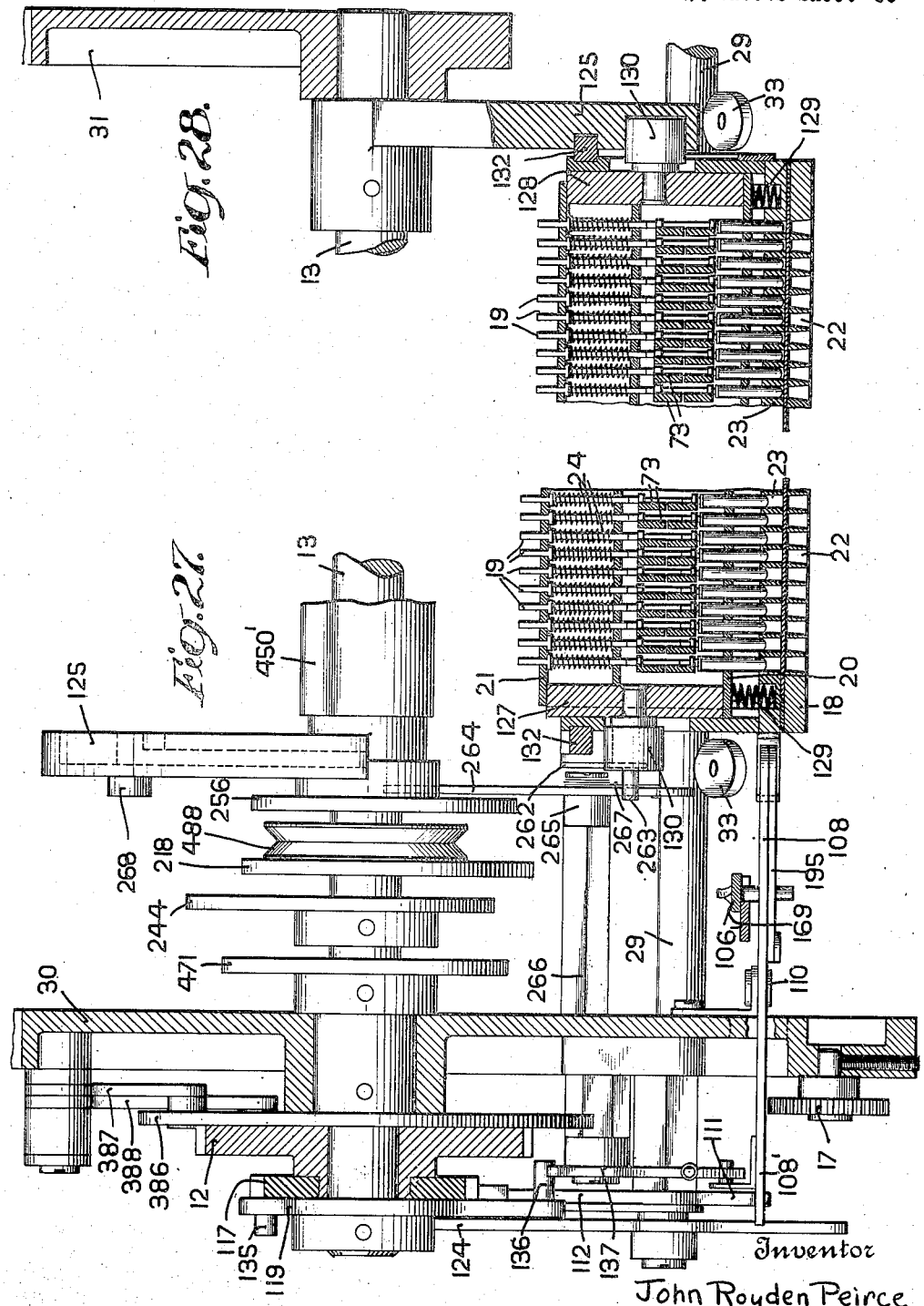

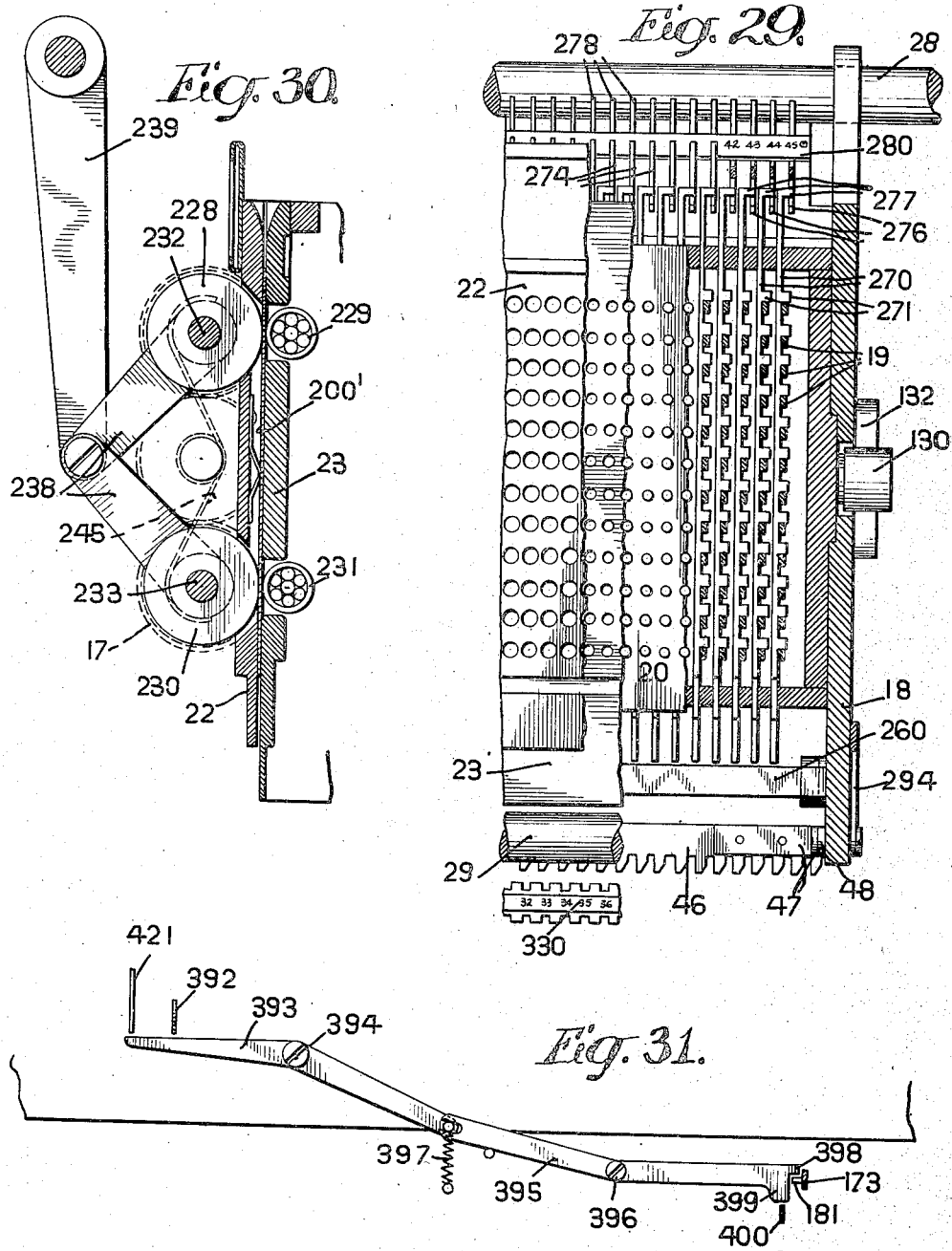

Oct. 4, 1932.  J. R. PEIRCE  1,880,472
PERFORATING MACHINE
Filed Dec. 3, 1927  24 Sheets-Sheet 17
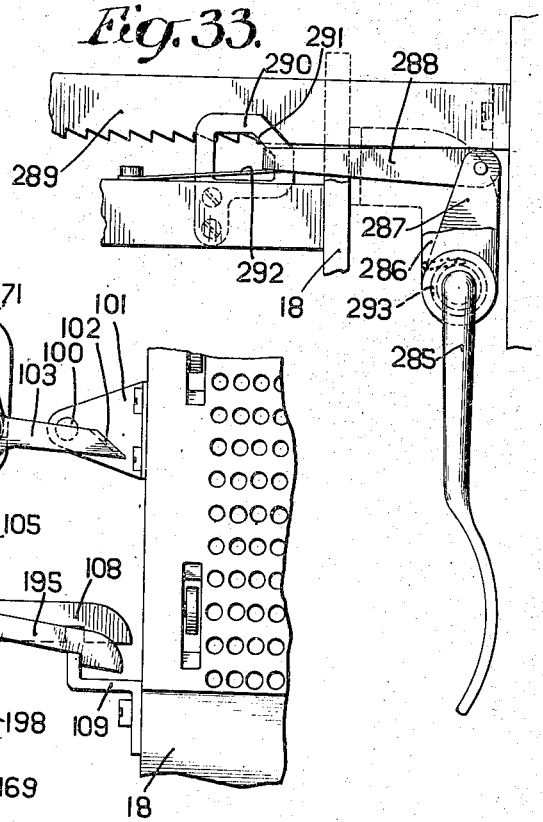
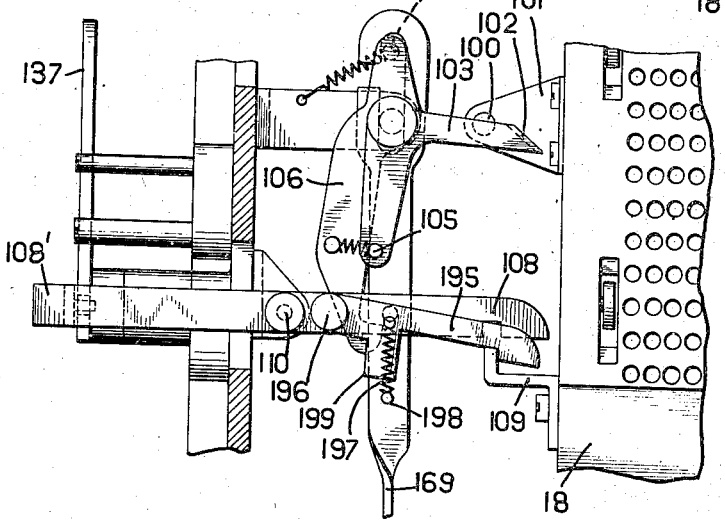
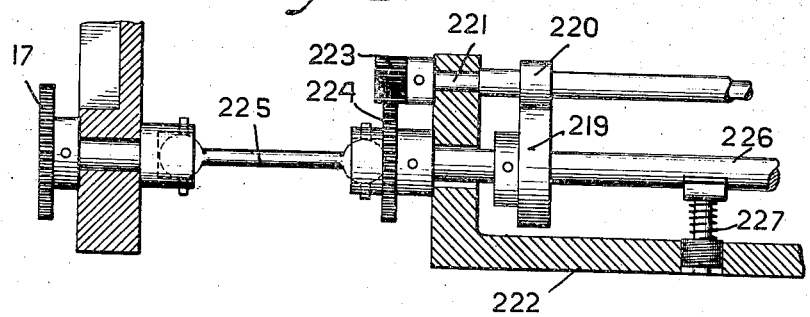
Inventor
John Royden Peirce
By his Attorney

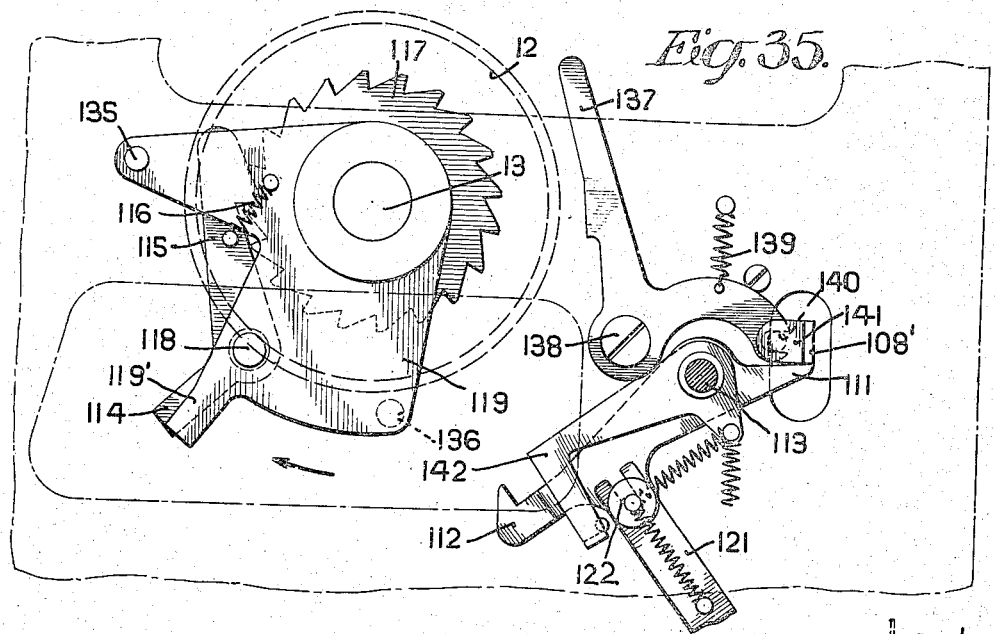
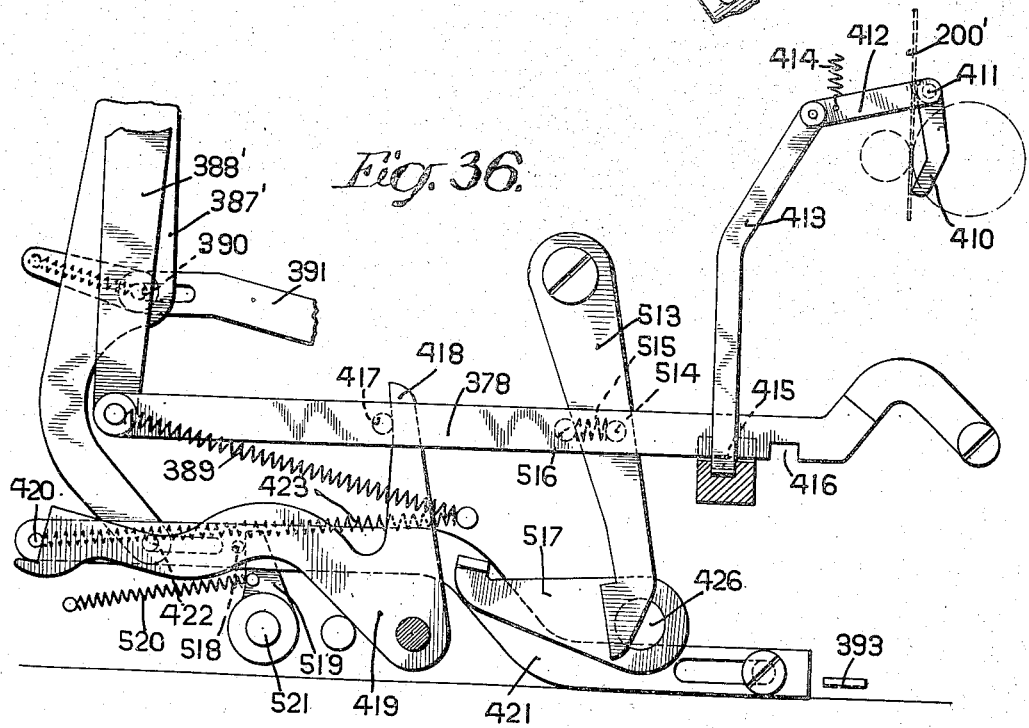

Oct. 4, 1932.  J. R. PEIRCE  1,880,472
PERFORATING MACHINE
Filed Dec. 3, 1927  24 Sheets-Sheet 19
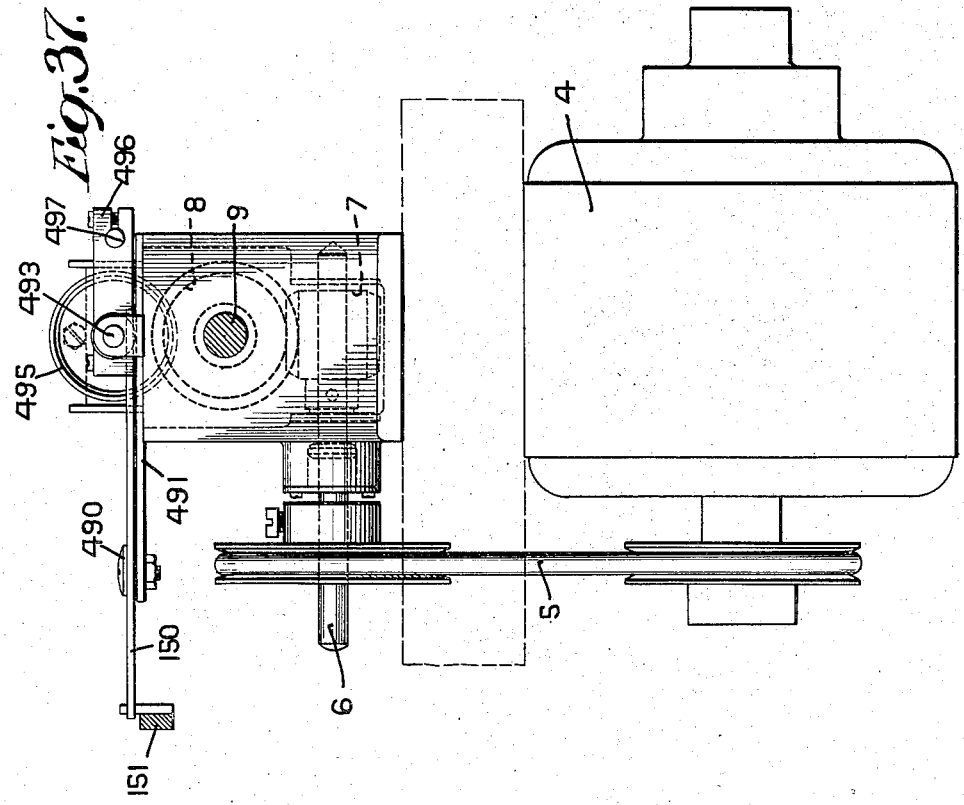
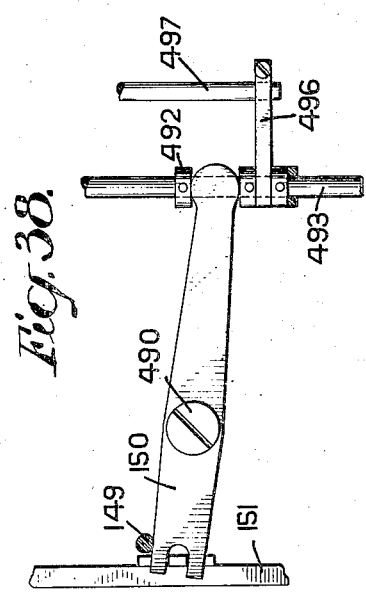
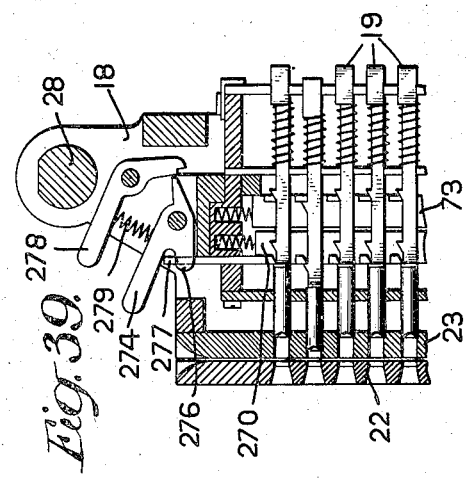
Inventor
John Royden Peirce
By his Attorney

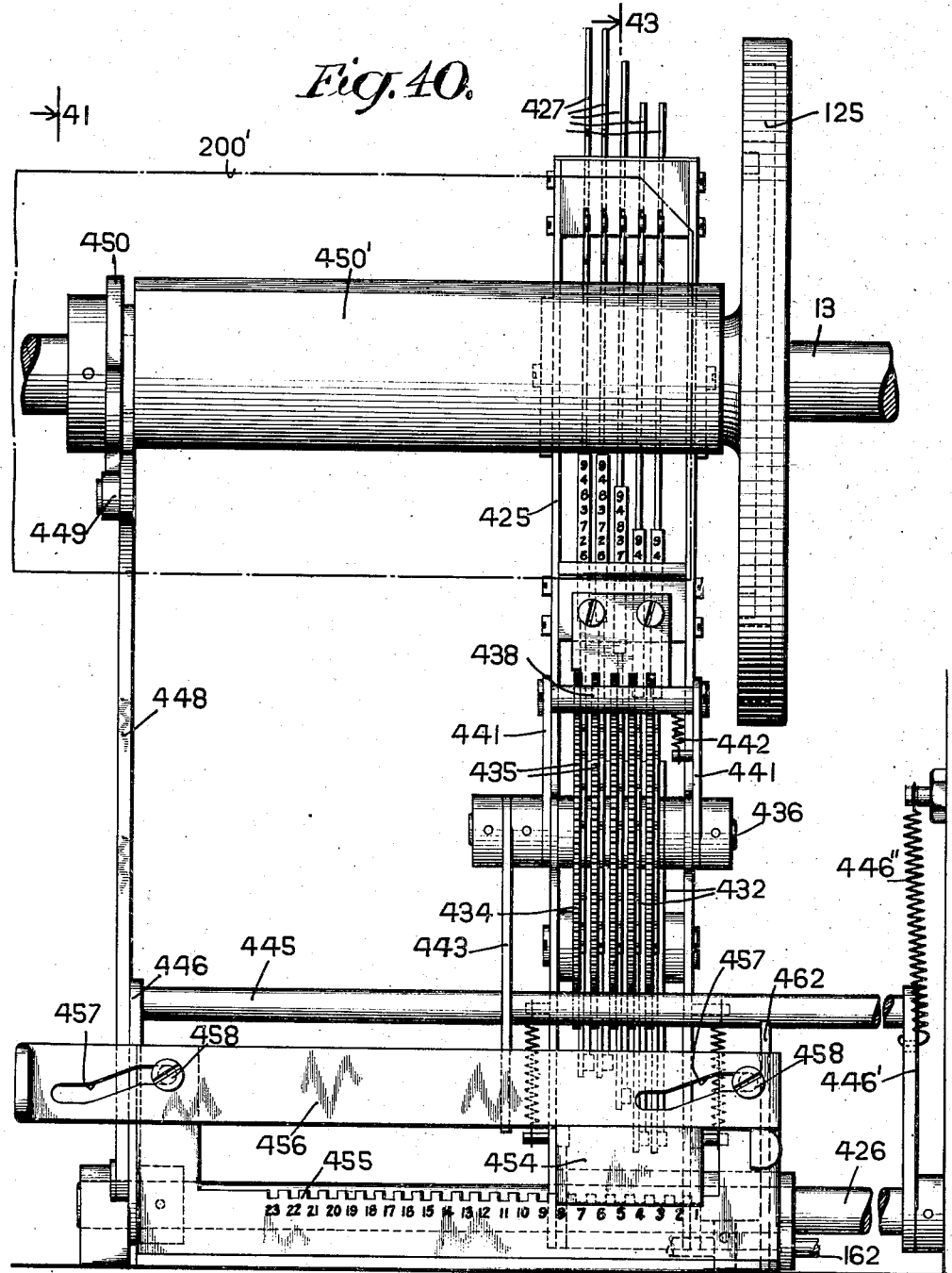

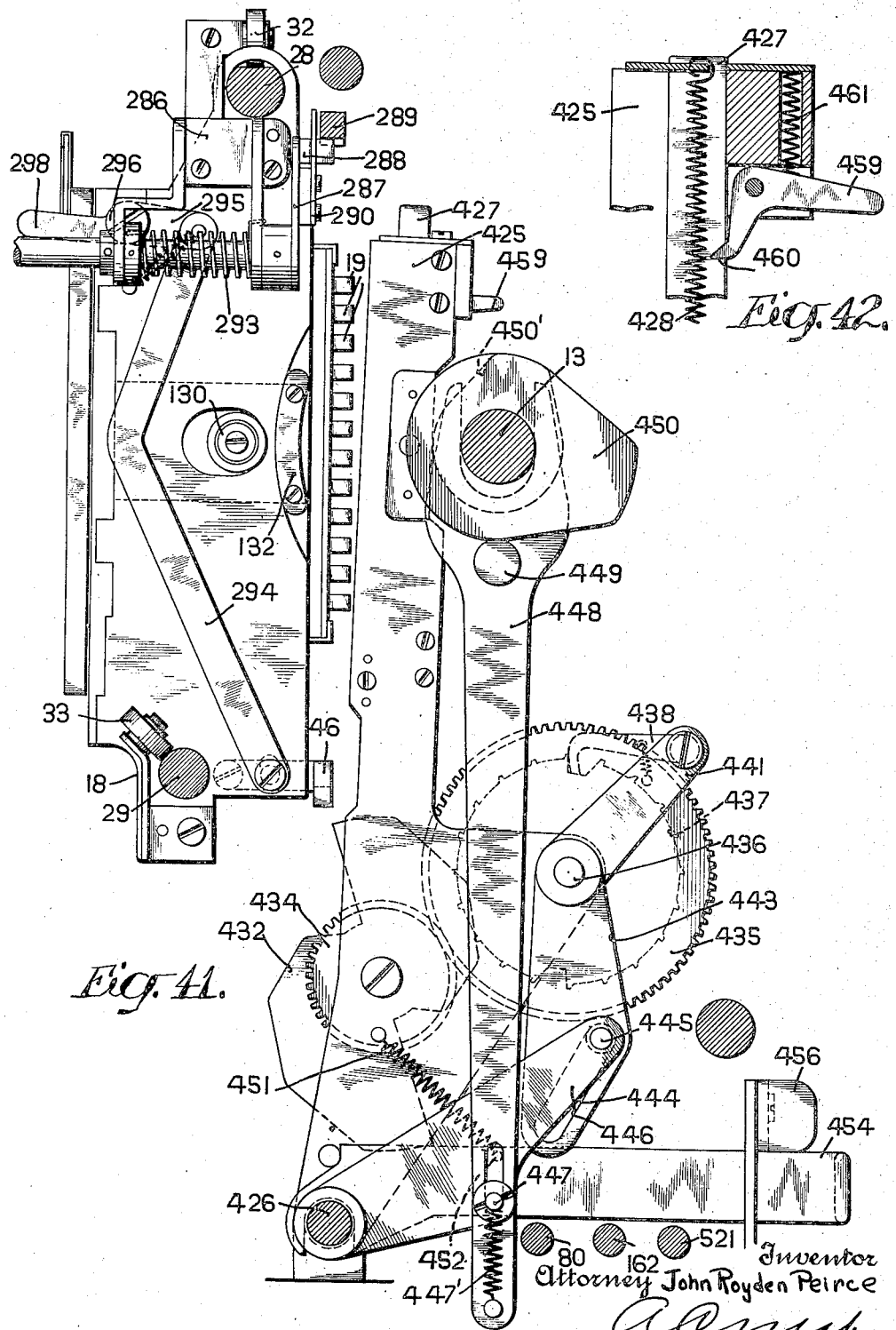

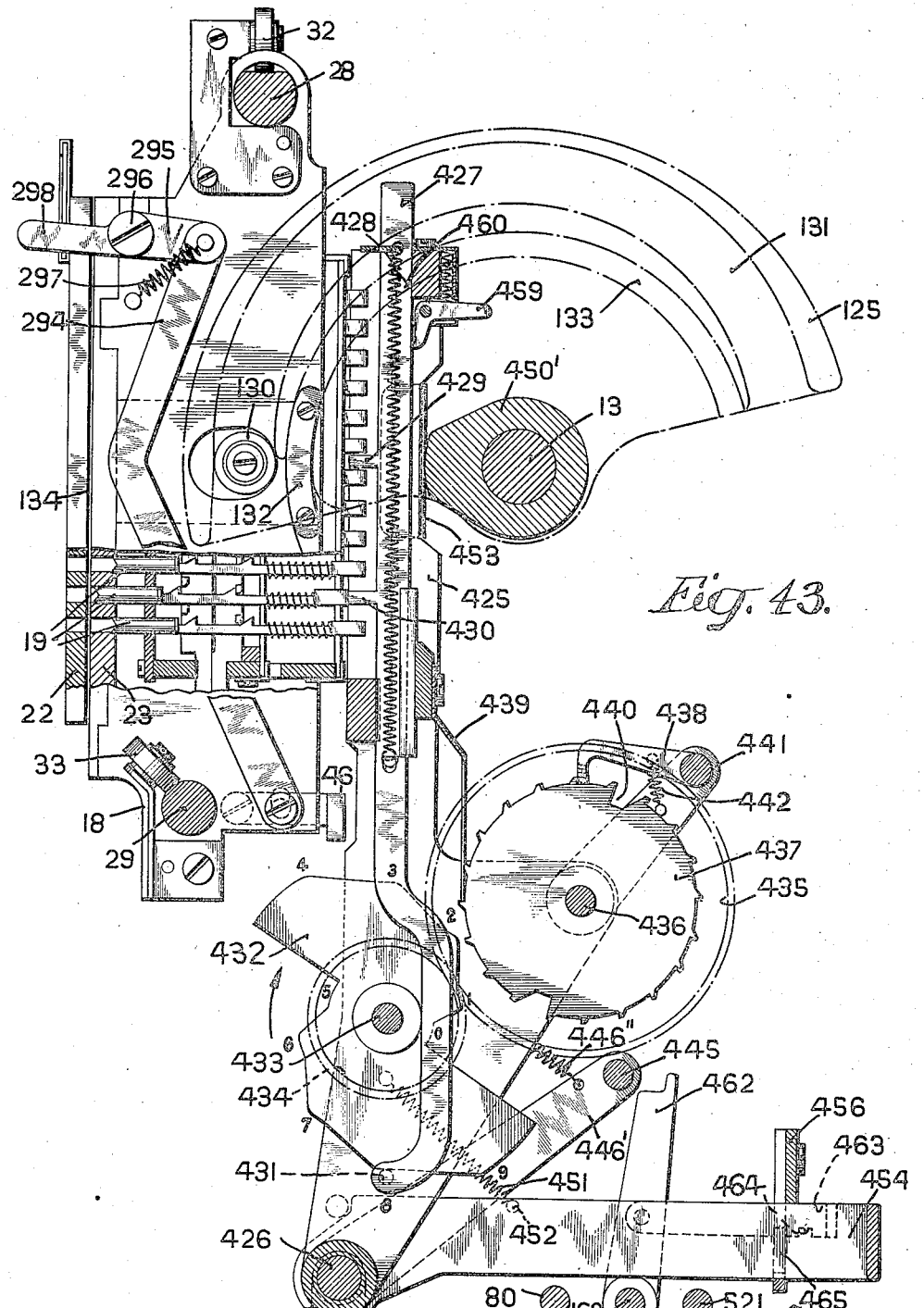

Oct. 4, 1932.  J. R. PEIRCE  1,880,472
PERFORATING MACHINE
Filed Dec. 3, 1927   24 Sheets-Sheet 23
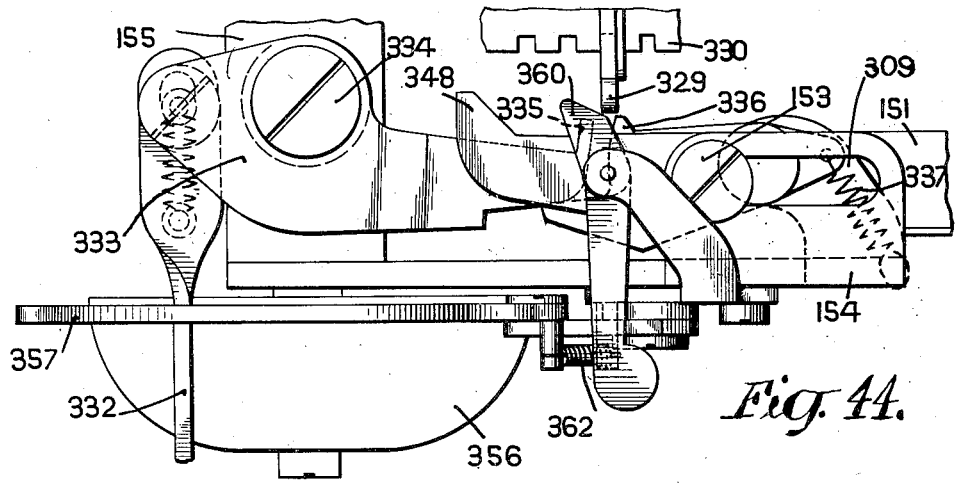
Fig. 44.
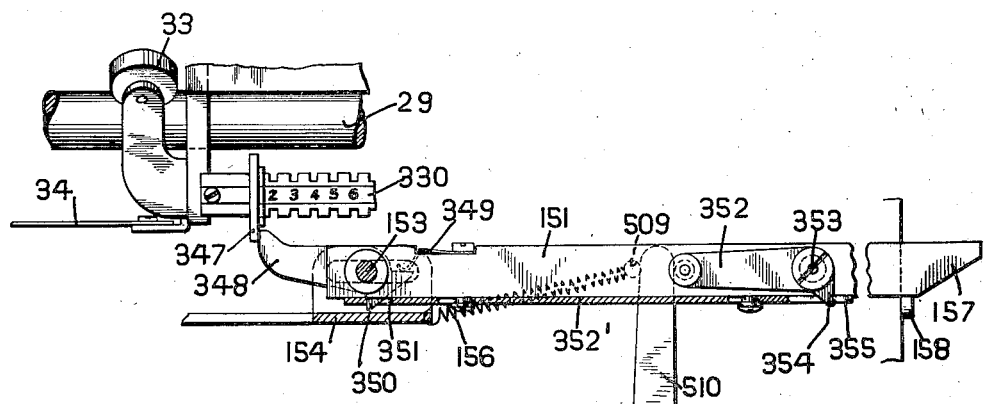
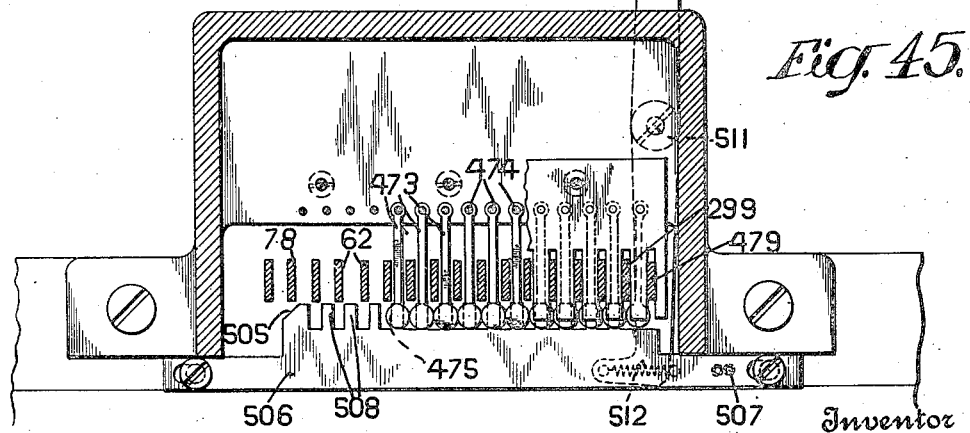
Fig. 45.
Inventor
John Royden Peirce
By his Attorney Oct. 4, 1932.  J. R. PEIRCE  1,880,472
PERFORATING MACHINE
Filed Dec. 3, 1927   24 Sheets-Sheet 24
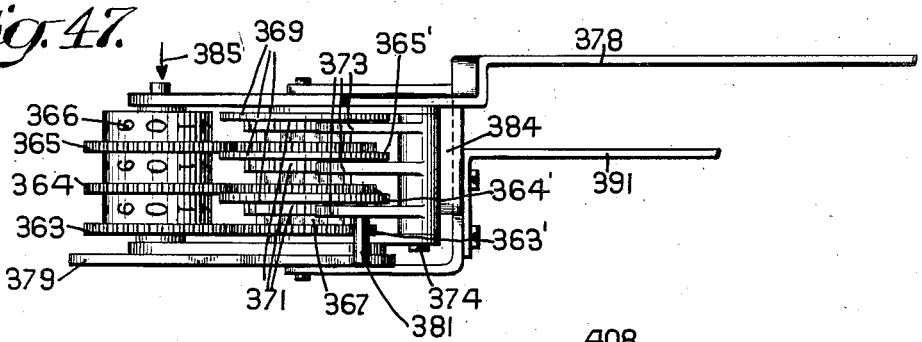
Fig. 47.
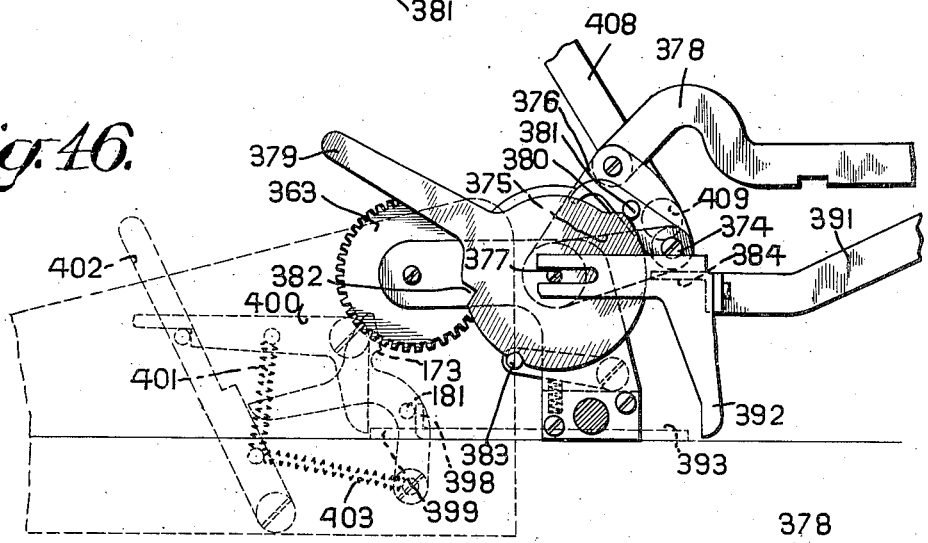
Fig. 46.
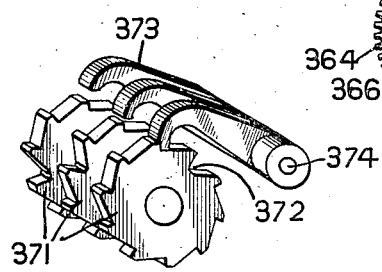
Fig. 49.
Fig. 48.
Inventor
John Royden Peirce
By his Attorney Patented Oct. 4, 1932

1,880,472

UNITED STATES PATENT OFFICE

JOHN ROYDEN PEIRCE, OF NEW YORK, N. Y., ASSIGNOR, BY MESNE ASSIGNMENTS, TO THE TABULATING MACHINE COMPANY, OF NEW YORK, N. Y., A CORPORATION OF NEW JERSEY

PERFORATING MACHINE

Application filed December 3, 1927. Serial No. 237,499

This invention relates to card perforating machines and more specifically to a machine for applying statistical and other data to record cards, adapted for use in the control of automatic tabulating machines, in the form of perforations. Statistical cards used in tabulating machines and commonly known as the Hollerith card are provided with a plurality of vertical columns of index point positions in which a hole is perforated in one of the positions in each column to indicate a value. Machines are provided in which a single row of punches is provided and the card is fed step by step or column by column past the punches and one of the punches is actuated between each feeding step to punch a hole in the column. Other machines are provided in which a row of punches is provided for each row of index point positions on the card, means being provided to set up one of the punches in each column and thereafter pressing the card against the punches thus set up or pressing the punches themselves against the card to perforate a hole in each of all the columns simultaneously. In the punching of cards, however, it is often necessary to punch the same data in certain columns of a large number of cards. For instance, if the date is being punched in the cards the same date will often be punched in all of the cards of a particular group. Also certain columns are frequently assigned for the perforation of a group number and large stacks of cards will bear the same group number so that in perforating the cards these numbers are repeated for each card.

One of the objects of the present invention is to provide improved means whereby a number which is to be repeated in a group of cards may be set up but once and automatically repeated in the perforating of each successive card, other data being reset for each of the cards.

Another object is to provide means whereby a number of punches may be set for operation and the machine then set to automatically feed a card to the punches, perforating the card and then automatically restoring the punches to normal position ready for a subsequent setting up operation.

Another object is to provide means whereby the machine will feed any predetermined number of cards to the punches and automatically punch the cards so as to apply the same data to all of the cards.

Another object is to provide means whereby serial numbers may be automatically perforated in the cards.

Another object is to provide means for collecting and disposing of the discs or chips produced in the perforating of the cards so that the discs will not clog the machine or become scattered over the floor.

Another object is to provide means whereby the punch setting carriage may be stepped backward one step, if a wrong punch has been set so that the correct punch may then be set and the wrong punch released.

Another object is to provide a back stepping mechanism by which the carriage may be stepped backward a plurality of steps in one operation, if desired.

Another object is to provide means whereby, in the setting of the punches column by column, certain groups of columns may be skipped by the depressing of a tabulator key permitting the carriage to jump to a predetermined column for the next punch setting.

Another object is to provide stepping mechanism of this nature in which after a punch in a predetermined column has been set, the carriage will automatically skip a plurality of columns to the next predetermined column for setting.

Another object is to provide means for automatically signalling when any predetermined column of punches has been reached for setting.

Another object is to provide means whereby the punch setting carriage may be automatically restored to normal position by the depression of a key.

Another object is to provide means whereby the carriage may be automatically returned after it has reached any predetermined position.

Another object is to provide means whereby the carriage control and other keys will be locked against operation when certain parts of the machine are not in their normal positions.

Another object is to provide means for insuring rapid movement of the parts in the setting of the punches without excessive shock.

Another object is to provide speed control means for controlling the speed of the punch setting carriage which control means will be automatically brought into operation when certain predetermined movements of the carriage are initiated.

Another object is to provide means for automatically removing the card feed rollers from feeding position after a card has been punched to permit the punch carriage to move from and to punching position.

Referring to the drawings wherein I have shown what I now consider to be the preferred form of my invention Fig. 1 is a perspective view of the machine.

Fig. 7 is an elevation of the left hand side of the machine taken on line 7—7 of Fig. 2 showing certain driving and clutching elements.

Fig. 8 is a fragmentary sectional view taken on line 8—8 of Fig. 5 showing the control keys and connections.

Fig. 9 is a detail of a signal device for indicating when a predetermined column has been reached in the setting up of the punches.

Fig. 10 is a fragmentary section taken on line 10—10 of Fig. 5 showing the carriage escapement mechanism and a governor for controlling the speed of movement of the carriage.

Fig. 11 is a detail of the governor mechanism.

Fig. 16 is a sectional detail of the punch carriage and means for selectively setting the punches, the view showing on a larger scale certain associated parts of the punch mechanisms shown in Fig. 5.

Figs. 17 to 20, inclusive, show four different kinds of stop slugs for controlling the skipping and other operations of the punch carriage and for signalling when the carriage has reached a definite position.

Fig. 21 is a detail of some of the control keys and governor device for controlling the speed of movement of the punch carriage.

Fig. 22 is a shock absorber for stopping the punch carriage when it reaches the left hand end of the machine.

Fig. 23 is a detail of the tabulator key and mechanism controlled thereby for controlling the skipping of the punch carriage.

Fig. 24 is a sectional detail of the skipping mechanism taken on line 24—24 of Fig. 23.

Fig. 25 is a sectional detail taken on line 25—25 of Fig. 23.

Figure 26:
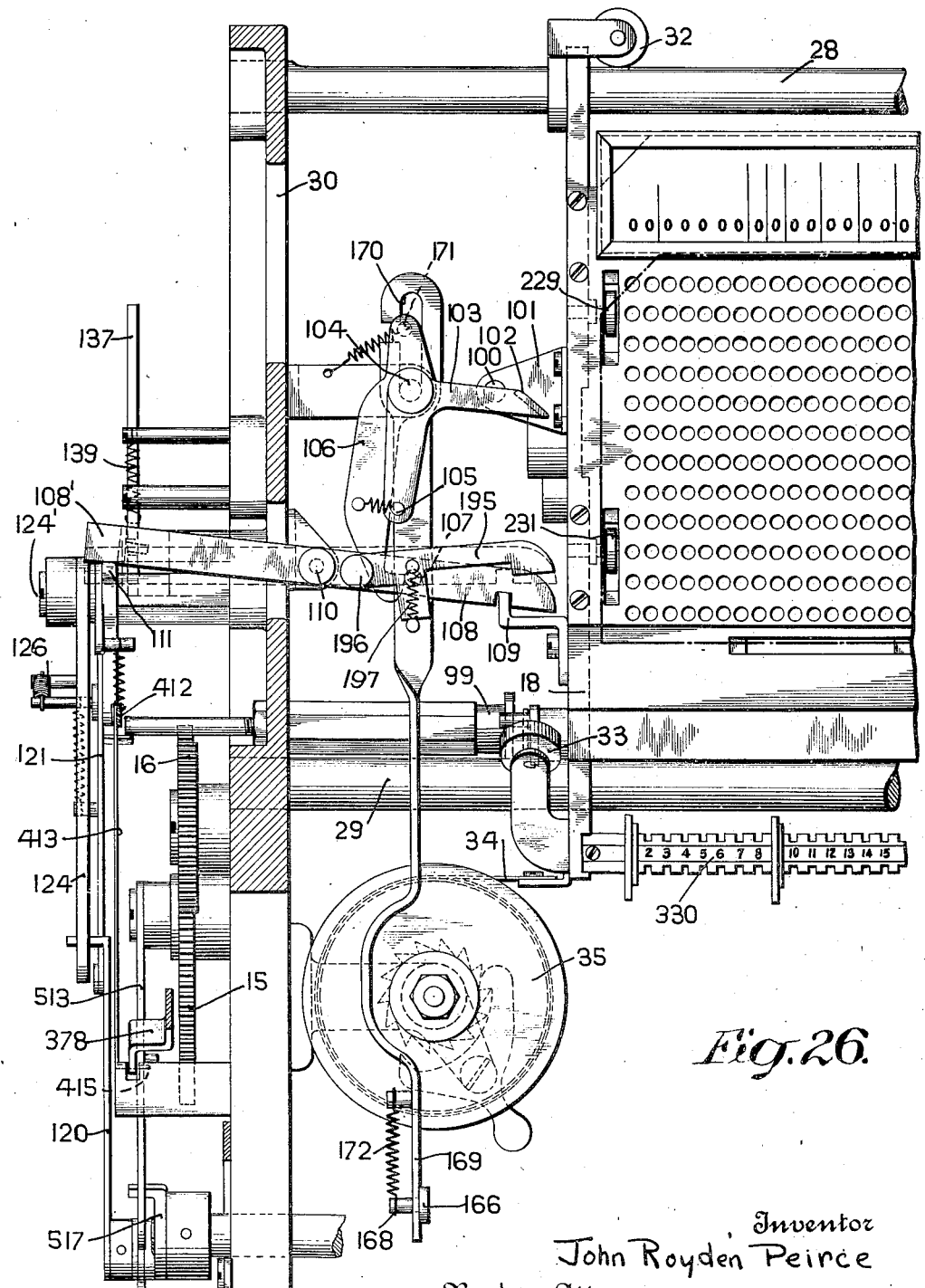

Fig. 26 is an enlarged detail view of the mechanisms contained at the left hand end of the machine with the punch carriage at this end, parts being shown in section to reveal the mechanism.

Fig. 27 is a sectional detail of the punch carriage in the left hand or punching position of the machine.

Fig. 28 is a continuation toward the right of the carriage with the parts in a different position.

Fig. 29 is a fragmentary detail sectional view of the punch carriage showing means for locking certain of the set punches in position.

Fig. 30 is a detail of certain of the card feeding rollers.

Fig. 31 is a detail of means for stopping the machine when the cards in the supply magazine are exhausted, or when a predetermined number of cards have been punched.

Fig. 32 is a detail of the latching mechanism for latching the punch carriage in punching position.

Fig. 33 is a detail of carriage back spacing mechanism.

Fig. 34 is a detail of a flexible drive to certain feed rolls.

Fig. 35 is a detail of a punch actuating clutch.

Fig. 36 is a detail of punch controlling mechanisms.

Fig. 37 is a detail of parts of the driving mechanism including an electric motor.

Fig. 38 is a detail of mechanism shown in Fig. 37.

Fig. 39 is a detail of punch latching mechanism for latching a set punch in position.

Fig. 40 is a view of means for controlling the operation of a selected group of punches and serially perforating numbers in the cards.

Fig. 41 is a sectional view taken on line 41—41 of Fig. 40 of the serial number punch mechanism.

Fig. 42 is a detail showing means for latching the serial number control mechanism out of operation.

Fig. 43 is a section taken on line 43—43 of Fig. 40 showing means for progressively actuating the serial numbering mechanism.

Fig. 44 is a detail of carriage control mechanism.

Fig. 45 is a sectional detail of carriage control mechanism and interlocking devices for the control keys.

Figs. 46 to 49, inclusive, are details of mechanism adapted when set to control the machine to perforate a predetermined number of cards under control of a single set up.

Referring to the drawings, the machine is shown mounted upon a base 1 (Fig. 1) having a table extension 2, the mechanism being contained within the casing 3. A motor 4 mounted in the base of the machine is adapted by a belt 5 (Fig. 37) to drive shaft 6 on which is mounted a worm 7 meshing with a worm wheel 8 fixed on the drive shaft 9. The drive shaft carries the pinion 10 (Fig. 7) which meshes with gear wheel 11 which in turn meshes with the gear 12 loose on the main cam shaft 13. Also fixed on the drive shaft is a gear 14 meshing with gear 15 which in turn meshes with the gear 16 for driving a train of gears 17 for operating the card feeding rollers.

The punch carriage

The machine is disclosed as being adapted for punching record cards, commonly known as Hollerith cards, in which there are twelve horizontal rows of index point positions and forty five vertical rows of such positions. The punch carriage 18 (Figs. 5, 16, 26, and 28) is therefore provided with twelve horizontal rows of forty five punches to each row, the punches 19 (Fig. 16) being mounted in front and back frame plates 20, 21 and cooperating with front and back die plates 22, 23 between which the cards are adapted to be held while being punched. A spring 24 cooperating with a rear shoulder on each punch and with an intermediate plate 25 is adapted to hold the punches in normal inoperative position and to restore the punches to such position after they have been released from their operative or set position. In the rear of the punch carriage is a single vertical row of punch setting plungers 26, the punch carriage being adapted to move step by step past the plungers 26 so that the vertical rows of punches will be brought step by step into cooperation with the plungers.

Figure 2:
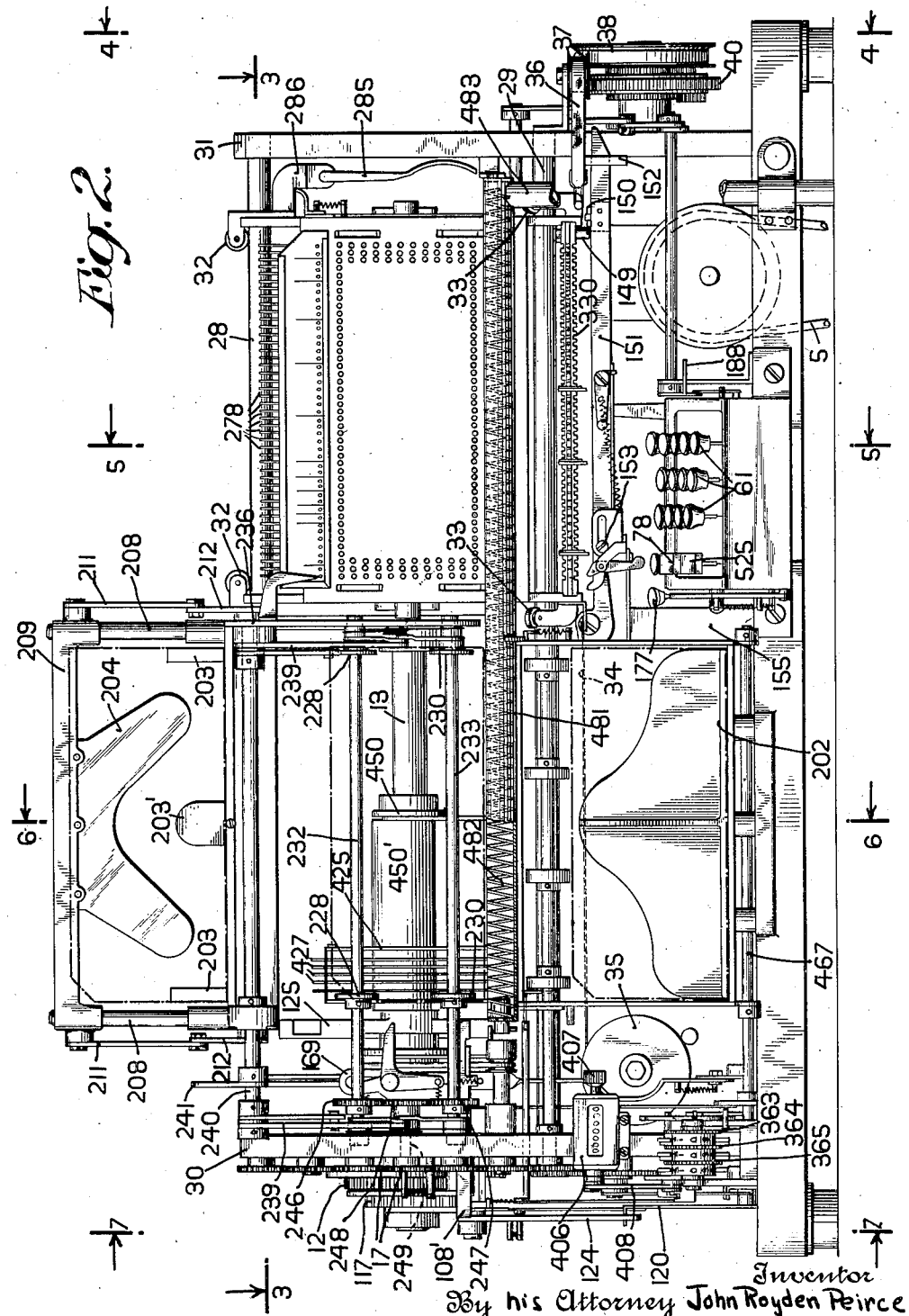
Fig. 2 is a front elevation of the machine above the base, with the covering removed.
Figure 3:
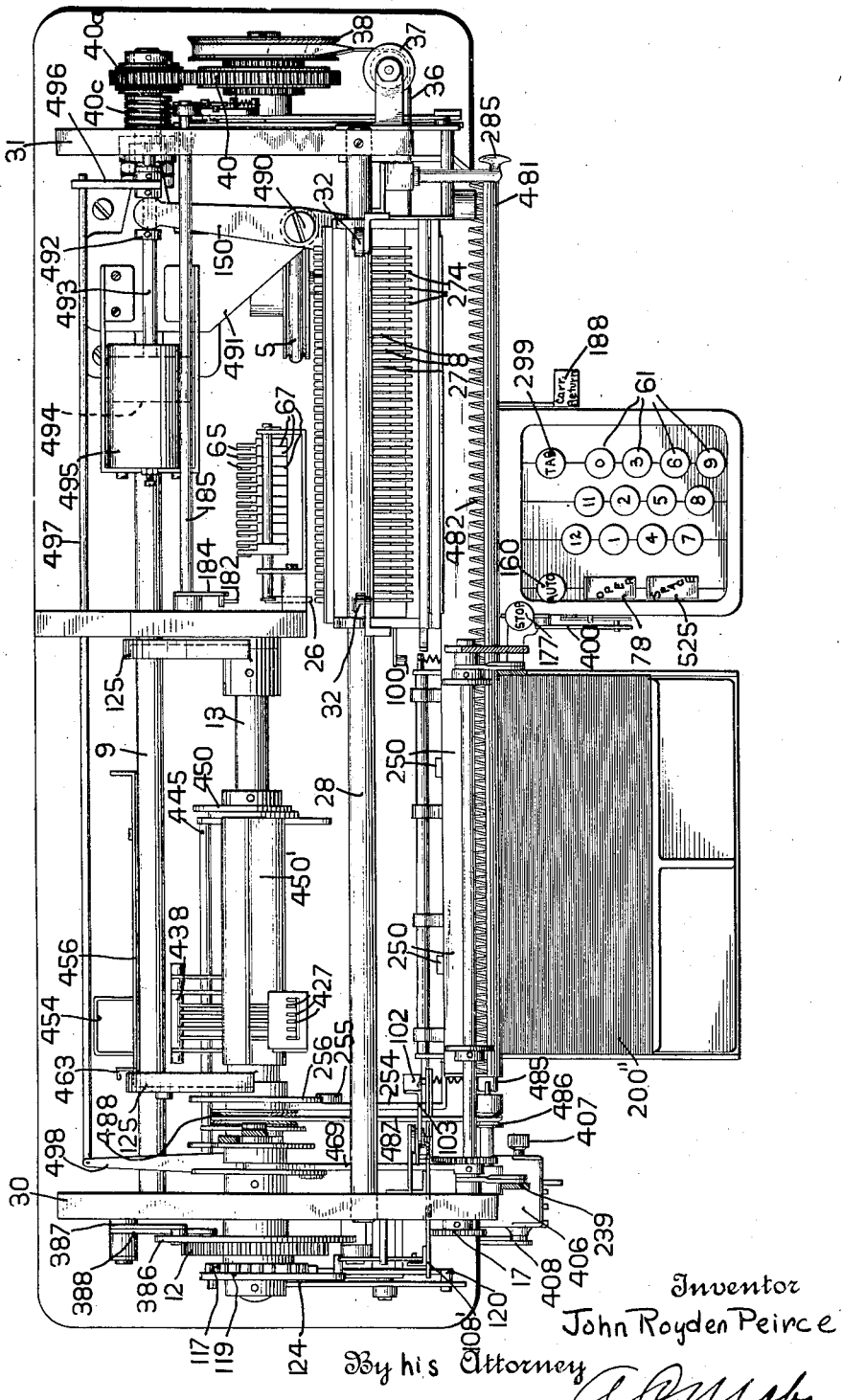
Fig. 3 is a sectional plan view taken on line 3—3 of Fig. 2.

The punch carriage is slidably mounted on upper and lower rods 28, 29 fixed, as shown in Figs. 2 and 3, to the side frames 30, 31. The weight of the carriage is borne by rollers 32, 33 mounted upon the carriage and resting upon the upper and lower rods 28, 29 respectively, the lower rollers 33 being angularly disposed as shown in Figs. 41, 43 to coincide with the direction of the force of the carriage upon the lower rod 29 due to the downward and lateral pressure, the latter being caused by the fact that the upper shaft 28 is out of alignment with the center of gravity of the carriage. By this arrangement, the weight of the carriage is borne entirely by the rollers and the rods serve as guides to prevent the rollers from leaving the rods. The carriage is thus adapted to move lightly and with greater speed across the machine. The carriage is connected at its left hand end by a tape 34 to the spring wound drum 35 (Figs. 2 and 26). When the carriage is moved from the left hand side of the machine to the right hand side the tape 34 rotates the drum 35 winding the spring contained therein thus storing energy which moves the carriage step by step to the left when the latter is released by the escapement mechanism to be described.

Figure 14:
Fig. 14 is a sectional detail of differential driving mechanism for the punch carriage.

The right hand end of the carriage is connected to a tape 36 (Figs. 2, 3 and 4) which passes around a guide pulley 37 and is attached to a drum 38 (see also Fig. 14). The latter drum is connected to the power drive mechanism for restoring the carriage to its right hand position against the action of the spring in the left hand drum 35.

Figure 12:
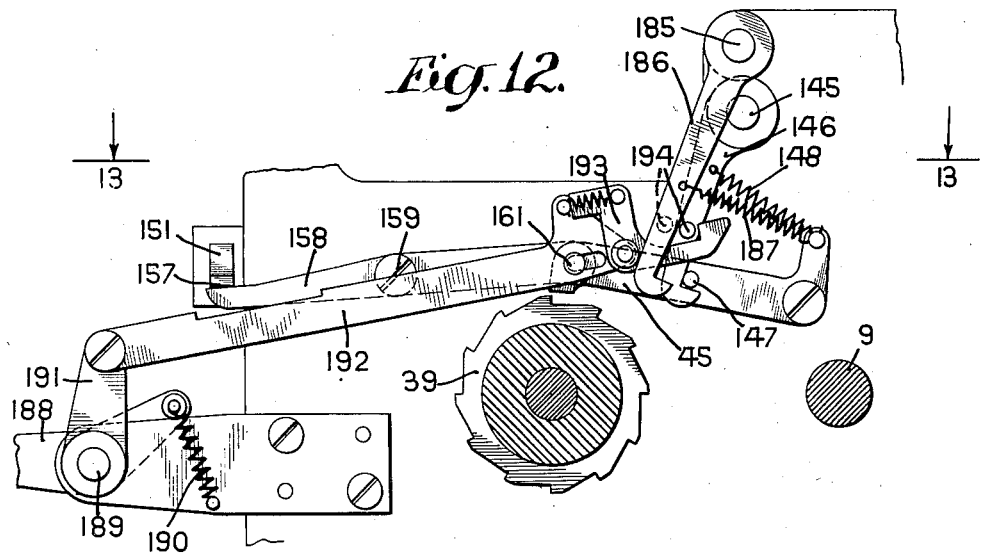
Fig. 12 is a detail of the carriage control mechanism.
Figure 15:
Fig. 15 is a fragmentary detail of the differential mechanism shown in Fig. 14.

Referring to Figs. 14 and 15, the drum 38 forms one part of a differential device, the other part of which is a ratchet wheel 39, the driving element being a gear 40 and the interconnecting elements being the intermeshing pinions 41, 42, carried by the gear 40 and meshing with gears 43 and 44 rigidly connected to drum 38 and ratchet 39, respectively. Normally, as the gear 40 rotates, the ratchet 39 which is free also rotates while the drum 38 being connected to the carriage and acting against the spring in the drum 35, remains stationary. When the pawl 45 (Fig. 12) is moved into cooperation with the ratchet 39 locking the latter against rotation the drum 38 will then, of course, be caused to rotate winding in the tape 36 and moving the punch carriage 18 toward the right. The actuation of the pawl 45 will be described later. Gear 40 is constantly driven by a gear 40a loose on shaft 9 but frictionally pressed between discs 40b by a spring 40c. This permits gear 40a to slip to absorb shock. Lock nuts 40d serve to adjust the pressure of spring 40c.

Figure 5:
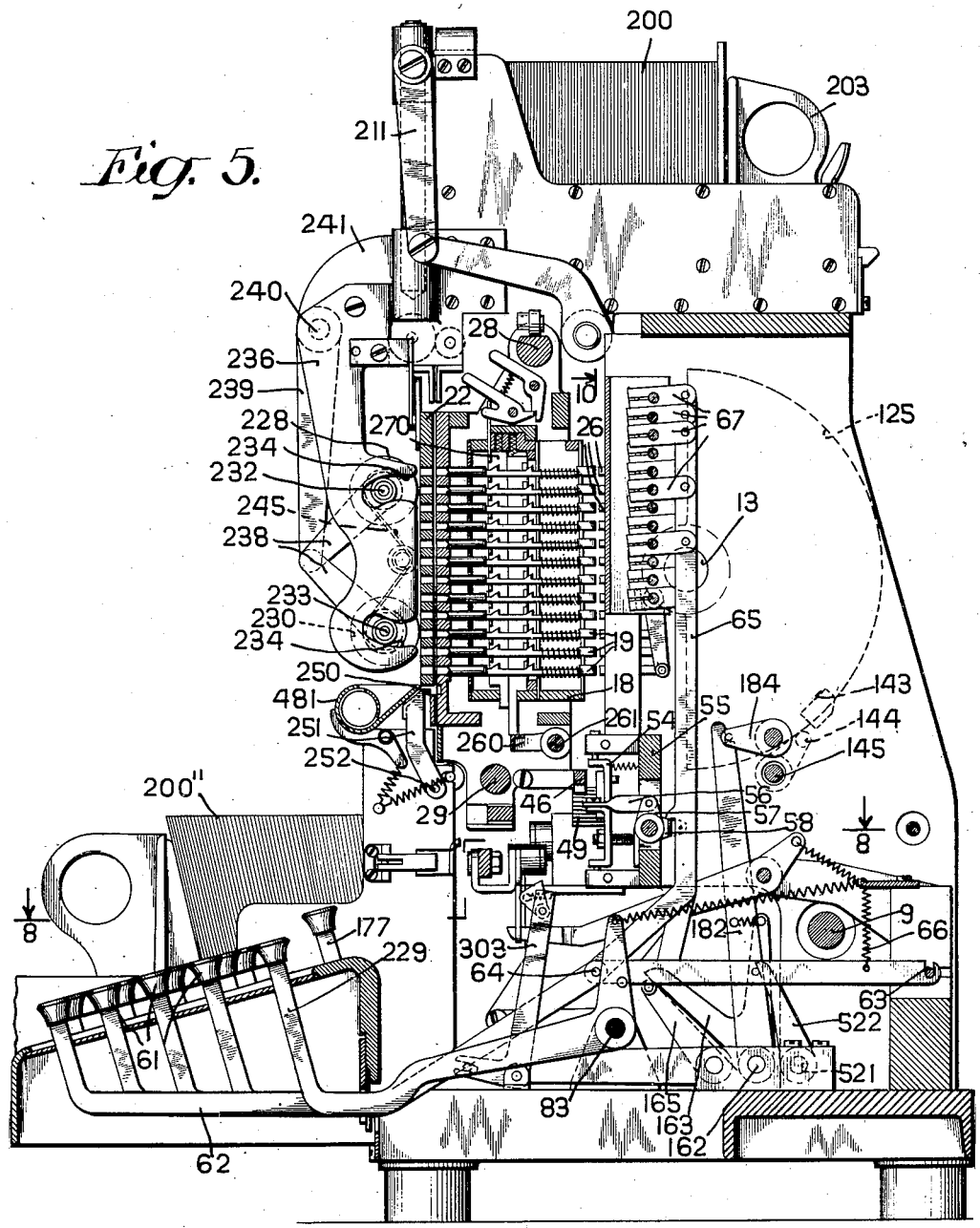
Fig. 5 is a sectional elevation taken on line 5—5 of Fig. 2 showing the punches and associated parts.

A toothed rack 46 reaches across the lower portion of the punch carriage 18 being attached thereto by brackets 47 pivoted on the carriage at 48 (Figs. 10, 16, 21 and 29). The rack 46 is thus adapted to rock into or out of cooperation with a ratchet pinion 49 (Figs. 5, 10, 16). Pinion 49 is associated with escapement ratchet 50, being constrained to rotate in one direction therewith by spring pressed pawls 51 but being permitted by the pawls to rotate in the opposite direction independently of the ratchet 50. Ratchet 50 is in turn controlled by escapement pawls 52, 53 carried by a member 54 mounted for oscillation about a vertical axis in the fixed frame 55. A link 56 connected to said member 54 and to an arm 57 fixed with respect to a bail 58 is adapted when the bail is depressed as viewed in Fig. 5 to rock the member 54 about its axis until the pawl 53 disengages the ratchet 50 whereupon the pawl will be rocked downwardly by its spring 59. The fixed pawl 52 will continue to prevent rotation of the ratchet 50. When the member 54 is oscillated back to its normal position, the movable pawl 53 then comes into position to be engaged by the next lower tooth of the ratchet wheel 50, while the fixed pawl 52 rides out of engagement with the ratchet 50 releasing the latter and permitting it to rotate counterclockwise as viewed in Fig. 10. The ratchet then engages the movable pawl 53 raising it against the action of its spring 59 until it strikes the stop 60. This permits the carriage to move one step to the left under the action of the left hand drum 35. The bail 58 is rocked by the actuation of the punch setting keys so that the carriage is thus released for movement of one step to the left each time a key is actuated to select and set one of the punches for operation.

*Punch selecting keys*

The numeral keys for selecting the punches are shown at 61 (Figs. 1, 2, 3, 5, and 8). Each of the numeral keys as shown in Figs. 5 and 8 is connected to an arm 62 pivoted at 63 to a rod at the back of the machine. At an intermediate point 64 a link 65 is connected to the arm 62 while a spring 66 is connected to arm 62 to hold the key normally in its upper position and to raise the link 65 to normal position. As shown in broken lines in Fig. 16, depression of a key 61 pulls the link 65 downwardly and through an arm 67 fixed on shaft 68, rocks the shaft 68 (see also Fig. 10) which is mounted in frame plates 69. The outer end of each shaft 68 has fixed thereto an arm 70 connected by pin and slot at its lower end to a plunger 26. As seen in Fig. 10 the shafts 68 being in the same vertical plane are cut progressively shorter and the arms 70 are provided with progressively longer offsets so that they may all cooperate with their respective plungers 26 which are in vertical alignment. When the punch carriage 18 is moved to its extreme right hand position, the first row of punches 19 to the left registers with the vertical row of plungers 26 so that when one of the numeral keys is depressed the corresponding plunger 26 will engage the rear end of its punch 19 moving the latter to the left as viewed in Fig. 16 where it will be latched by a projection 72 on a latching plate 73 cooperating with a projection 74 on the punch. There is one plate 73 for each vertical row of punches and one projection 72 for each of the punches. The plate 73 is pressed downwardly by its spring 75 and when a punch is set its projection 74 engages the corresponding projection 72 upon the plate camming the plate upwardly until the projection 72 escapes and drops behind the projection 74 thus locking the punch in set position. The punch setting operation, through a projection 76 on the link 65, rocks the bail 58, previously referred to, downwardly to actuate the carriage escapement mechanism. After the key has been released and the link 65 rises withdrawing the plunger 26 to normal position and permitting the bail 58 to raise, the punch carriage then moves one step to the left bringing the next vertical row of punches into register with the plungers. The pawl 77 (Fig. 10) is adapted to prevent rebound motion of the escapement wheel 50. After the last of the punches has been set the carriage can then be released to move to its extreme left hand position after which a card will be fed to the punches, the punches actuated to perforate the card, the card then being fed from the punches to the discharge magazine and the carriage returned to the right and the punches restored to normal or inoperative position ready for the next punch setting operation.

*Punch control mechanism*

After the last of the punches has been set up the punch carriage will be moved farther to the left to punching position for punching the card. This is effected by depression of the operation key 78 (see Figs. 8 and 21). This rocks arm 79 downwardly about its pivot 80 and through pin 81 fixed to said arm rocks the arm 82 about its pivot 83 rocking also arm 84 counterclockwise about pivot 83. The latter arm engages a pin 85 fixed to the frame 86 pivoted at 328 to the frame of the machine. Frame 86 supports a ratchet pinion 87 adapted to cooperate with the rack 46. Arm 84 rocks frame 86 and causes pinion 87 not only to engage rack 46 but at the same time lifts the rack 46 about its pivot 48 from the position of Fig. 10, out of cooperation with the ratchet pinion 49 of the escapement device. The carriage will now be free from the action of the escapement device and will tend to move freely to the left. The ratchet pinion 87, however, is adapted to control the speed of the movement of the carriage through a governor device. For this purpose the ratchet 87 is mounted on the same shaft with a beveled pinion 88 (see also Fig. 10) which in turn meshes with a beveled pinion 89 connected through a universal joint 90 to shaft 91 having a universal connection at 92 with a gear 93 meshing with a pinion 94 on the same shaft 95 with a star wheel 96 adapted to rotate in a cylindrical casing 97 (see also Fig. 11). Disposed between the teeth or spokes of the star wheel is a brake block 98 which, when the star wheel rotates, will be thrown out against the walls of the case 97, while being carried around by the star wheel. The action of the block 98 upon the casing 97 tends to retard the rotation of the star wheel and this through the connections described to the ratchet 87 will control the speed of movement of the carriage to the left. When the carriage reaches its extreme left hand position it will strike a cushioned bumper 99 (Figs. 22 and 26) and be stopped thereby. In reaching this position a stud 100 (Figs. 3 and 26) carried on bracket 101 fixed to the punch carriage will engage an inclined projection 102 on bell crank 103 rocking the latter clockwise about its pivot 104. This in turn will, through the pin 105, rock the latch 106 to the left out of cooperation with pin 107 fixed on a latch member 108 pivoted at 110, permitting the latter to move downwardly into cooperation with a bracket 109 fixed on the punch carriage, thus locking the punch carriage against movement to the right. A rearward projection 108' of the latching arm 108 will thus be raised releasing the rear end 111 of a clutch latch 112 (see also Figs. 27 and 35) pivoted at 113. The latch 112 is normally in cooperation with tail piece 114 of a clutch pawl 115 (as viewed in Fig. 7) holding the latter against the action of its spring 116, out of cooperation with clutch ratchet 117 which is fixed with respect to the gear 12 constantly rotating loosely on shaft 13. The clutch pawl 115 is pivoted at 118 to the sector member 119 (Figs. 7 and 35) and the spring 116 is connected between the pawl and sector, the sector being fixed to the shaft 13. When the operating key is depressed it rocks the rod 80 (Figs. 21, 8, 7) clockwise as viewed in Fig. 7. An arm 120 fixed to the rod 80 will thus be rocked downwardly pulling with it a link 121 cooperating with the latch 112 through pin and slot connection 122 and through a spring 123. Thus, when the operating key is depressed the spring 123 will be stretched tending to rock the latch 112 out of cooperation with the clutch pawl 115. Then when the arm 108' is raised the latch 112 will release the clutch pawl 115. The arm 120 is in the meantime latched in its down position by latch 124 pivoted at 124' and actuated by spring 126. The releasing of the clutch pawl 115 permits the latter to engage the clutch ratchet 117 so that the latter will now, by the sector 119, cause the cam shaft 13 to rotate clockwise as viewed in Figs. 7 and 35.

*Punch actuating mechanism*

Cam shaft 13 has fixed thereto oppositely disposed cam members 125 (Figs. 2, 6, 27, 28). The frame plates 20, 21 (Figs. 16 and 27) are interconnected by plates 127, 128 and constitute a movable carriage within the carriage 18, the inner carriage being held normally in the rearward position within the carriage 18 by spring 129. The inner carriage carries at its opposite ends cam follower rollers 130 adapted to be engaged by a cam groove 131 in each of cams 125. The outer carriage 18 on the other hand has fixed thereto at each of its opposite ends a shoe 132 (Figs. 27, 41, 43) adapted to cooperate with a concentric groove 133 on the cam members 125 as indicated in Fig. 43. Thus when the cam shaft 13 rotates, the concentric groove 133 will engage the shoe 132 and the cam groove 131 will engage the rollers 130. The carriage 18 will thus be held against movement while the inner frame 20, 21 will be moved with the punches to the left as viewed in Fig. 43 far enough to cause those of the punches that have been locked in set position to perforate a card lodged in the space 134 between front and back die plates 22, 23. Continued rotation of the cam shaft and cam members 125 will then restore the frame 20, 21 with the punches to normal position after which the cam members 125 will release the rollers 130 and shoes 132. During the clockwise rotation of cam shaft 13 as viewed in Figs. 7 and 35 and while the punching is being effected, a stud 135 carried by the sector 119 will engage a lateral projection 124'' of arm 124 rocking the latter against the action of its spring 126 and releasing the arm 120. Also a stud 136 carried by the sector 119 will rock an arm 137 pivoted at 138, against the action of its spring 139 and through pin and slot connection 140 with a bracket 141 fixed on the arm 108' will depress the latter, rocking the latch 112 into operative position to engage the clutch pawl 114 to remove the latter from cooperation with the clutch ratchet 117. Latch 112 also engages the projection 119' on the sector 119 to stop the rotation of the cam shaft 13. The spring-pressed member 142 will cooperate with the rear of the projection 119' to prevent rebound action of the shaft 13.

Figure 4:
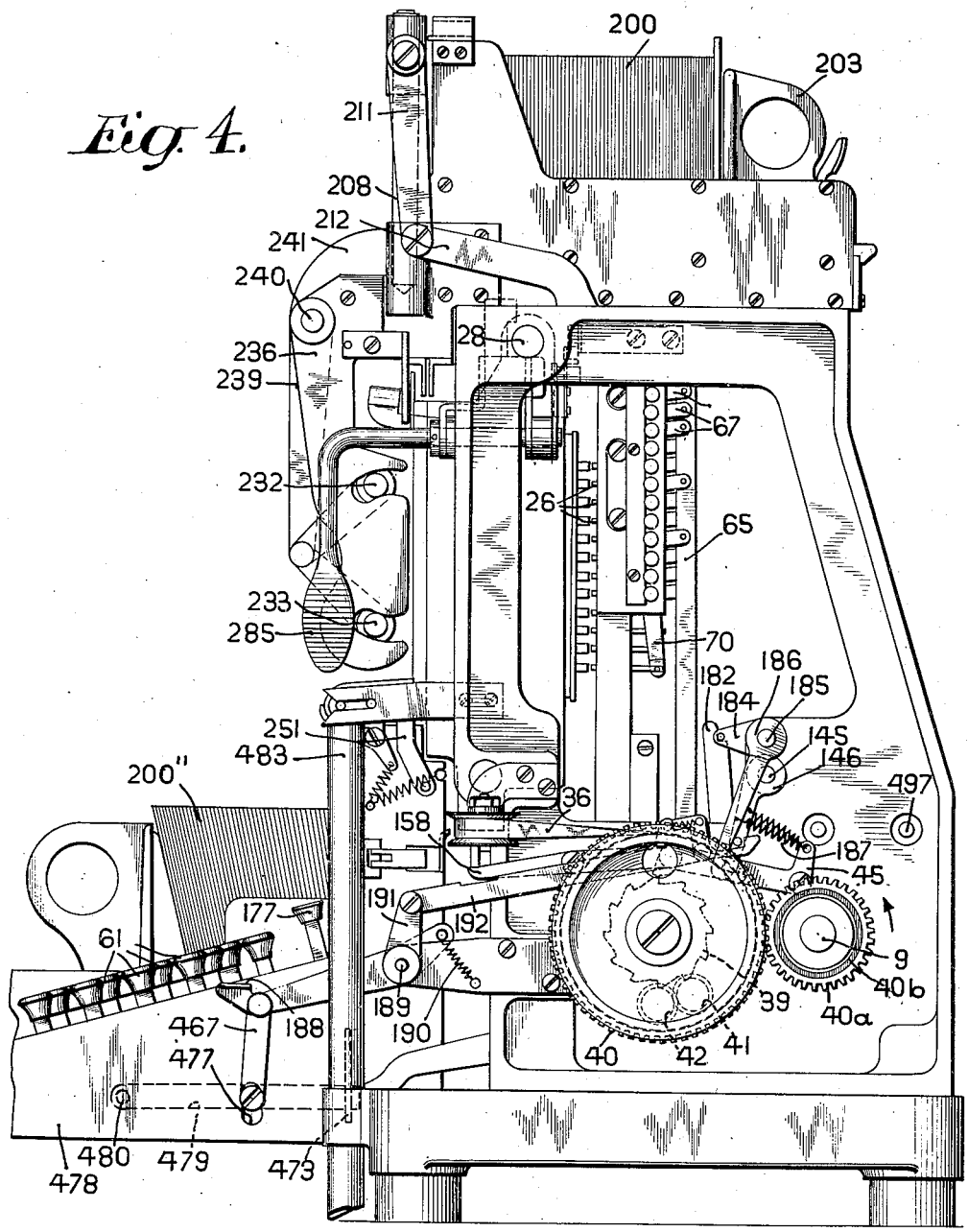
Fig. 4 is an elevation taken on line 4—4 of Fig. 2.
Figure 13:
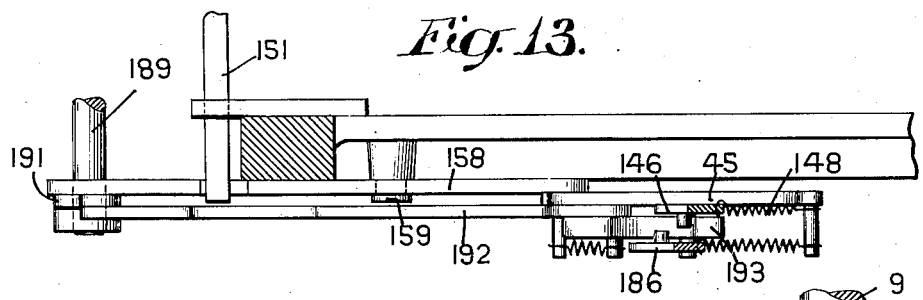
Fig. 13 is a section taken on line 13—13 of Fig. 12 of such control mechanism.

Near the end of the rotation of shaft 13 a projection 143 (Fig. 5) on one of the cams 125 engages an arm 144 fixed on shaft 145 to rock said shaft clockwise as viewed in Figs. 4 and 5. Also fixed on the shaft is a latch 146 (see also Figs. 12 and 13). The latch normally cooperates with a pin 147 on the pawl 45 previously referred to so that the latch will now be moved out of cooperation with said pin permitting the spring 148 to rock the pawl into cooperation with ratchet 39. This will control the differential mechanism described in connection with Fig. 14, to cause drum 38 to rotate to return the punch carriage to the right hand side of the machine.

When the carriage reaches its right hand position, a stud 149 (Fig. 2) fixed on the carriage engages a lever 150 cooperating with a sliding bar 151 mounted in a bracket 152 fixed to the frame 31 and having pin and slot connection at 153 with a bracket 154 fixed to the central frame member 155 (see also Figs. 44 and 45). This moves the bar 151 to the right against the action of its spring 156. The right end of the bar 151 (as seen in Figs. 2 and 45) is inclined as at 157 and cooperates with a lever 158 (Fig. 12) rocking the latter downwardly about its pivot 159 and through a pin and slot connection at 161 with the pawl 45, raises the latter. The pawl will thus be raised out of cooperation with the ratchet 39 when the carriage reaches its extreme right hand position. The latch 146 will then reengage the stud 147 to hold the pawl 45 in its upper position as in Fig. 12.

The lever 150 is pivoted at 490 (Figs. 37, 38) to a fixed bracket 491 and its rear end rests between collars 492 fixed on a rod 493. This rod is connected to the piston 494 (Fig. 3) of a dash pot 495. The dash pot thus serves to absorb the shock of the punch carriage reaching its right hand position when the pin 149 strikes lever 150.

An arm 496 (Figs. 3 and 38) fixed to shaft 493 is connected to a rod 497 which reaches across the back of the machine and is connected to a lever 498. This lever is pivoted at 499 (Fig. 6) to a fixed bracket and its opposite end rests back of a stud 500 fixed to the bumper member 99 (see also Fig. 22). When the punch carriage, in its movement to the left, strikes the bumper and compresses it, the spring 501 will tend to restore the bumper after the carriage has been restored. But where this bumper is in the form of a dash pot the action of the spring is slow.

By connecting the lever 498 to the dash pot 495, the force of the carriage upon the dash pot 495 when it reaches the right side of the machine will act to restore the bumper 99.

*Repeat punching*

Figure 6:
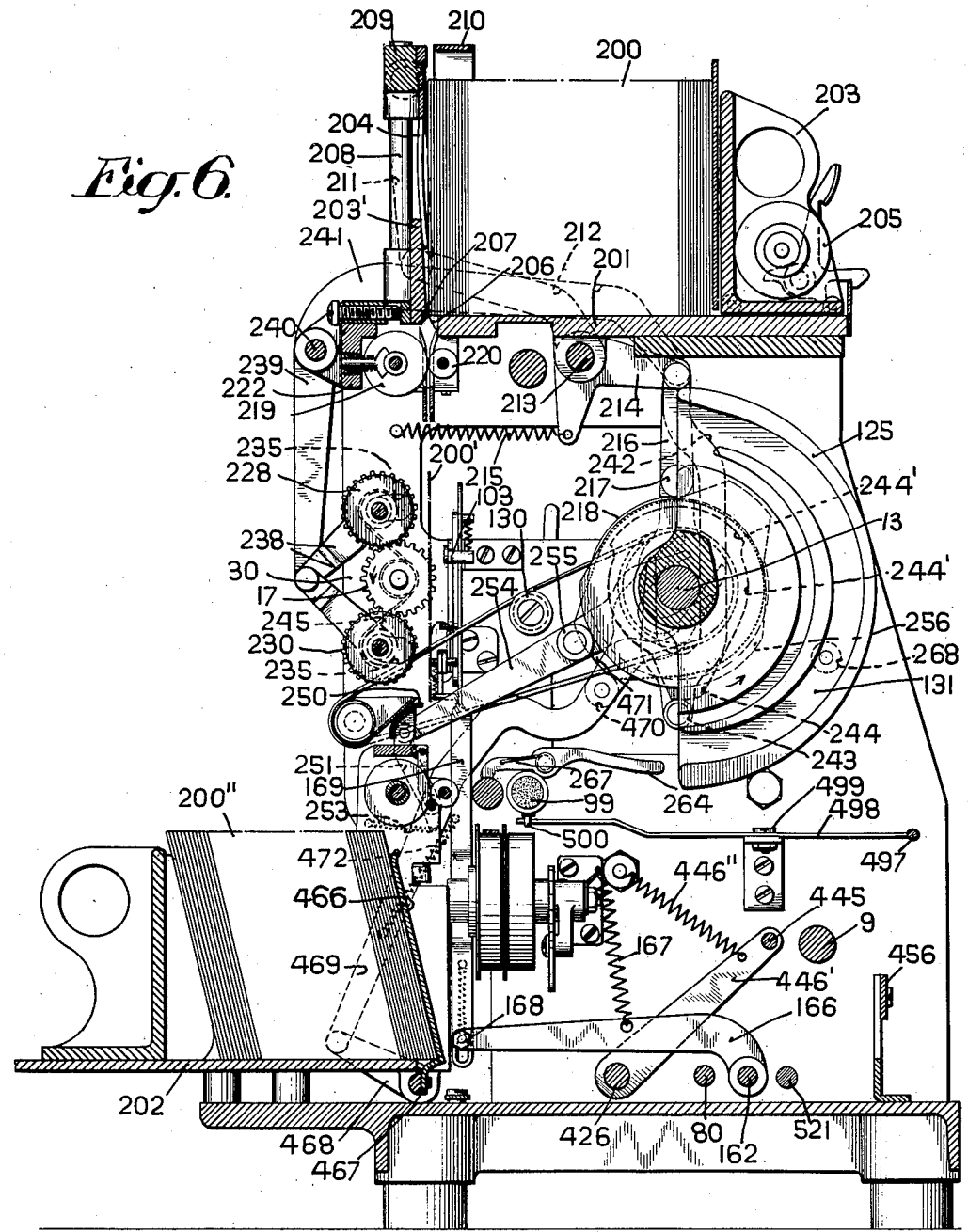
Fig. 6 is a sectional elevation showing the card feed mechanism taken on line 6—6 of Fig. 2.

If it is desired to perforate several cards according to the set up of the punches before the carriage is returned to the right, this may be effected automatically by depressing the automatic key 160 (see Figs. 3, 8, 21). Depression of the automatic key 160 rocks the arm 161 (Fig. 21) downwardly, rocking the shaft 162 counterclockwise and with it the arm 163 which engages a stud 164 on an arm 165 fixed on the operating shaft 80. The latter is thus rocked counterclockwise with arm 79 and through pin 81 causing depression of arm 82 and the actuation of arm 84 against pin 85 on frame 86, rocking said frame on its pivot 328 and thus raising the governor pinion 87 into cooperation with the rack 46. The punch carriage will then proceed to move automatically to the left, as described, where it will be latched and the cam shaft will commence to rotate as described. The rocking of shaft 162 will rock an arm 166 (Fig. 6) downwardly against the action of its spring 167 and through resilient pin and slot connection 168 with a link 169 will move the latter downwardly from the position shown in Fig. 26 to that shown in Fig. 32. When the key is depressed a spring 172 (Fig. 26) will stretch. After the carriage has reached its left hand position and latch 106 has been moved to unlatching position, moving the pin 171 to the right and releasing the upper or latching end of the link 169 the spring 172 will then draw the link downwardly to cooperate with the pin 171 (as in Fig. 32) to prevent the latch 106 from cooperating with pin 107 on the arms 108, 108' when the latter is rocked by the action of pin 136 in Figs. 7 and 35. Thus when the arm 108' is depressed it is still free to rise again under the action of spring 123 as the arm 120 (Fig. 7) is held in its lower position by a latch 173 (Fig. 21) which cooperates with a pin 174 on the stem of the automatic key. The latch 173 is pivotally supported at 175 and is actuated by a spring 176 to cause it to move into latching position. Thus at the end of each cycle of operation of the machine, instead of the latch 112 stopping the rotation of the cam shaft the latter will be permitted to rotate to punch additional cards until the machine is caused to stop. This stopping may be effected by depressing the stop key 177 (Figs. 3, 5, 8, 21). The stop key is pivoted at 178 and is held in its normal position by a spring 179 and is adapted at its lower end 180 to cooperate with the pin 181 (Figs. 8 and 21) on the latch 173 rocking the latter out of cooperation with the automatic key, permitting the key to be raised by the action of spring 167 (Fig. 6). This restores the link 169 (Figs. 6 and 26) releasing the latch 106 so that the latter will lock the arm 108' down and the arm 108 up after the actuation by the stud 136 (Figs. 7 and 35). Also when the automatic key is depressed to cause the punching operation to be repeated several times, an arm 182 (Fig. 21) loose on the shaft 162 and resiliently connected to an arm 163' integral with arm 163, will be actuated by a pin 183 on the arm 163' out of cooperation with an arm 184 fixed on a rod 185. The rod 185 (as shown in Fig. 3) reaches across to the right hand end of the machine and carries rigidly fixed to its right hand end a latch 186 (Fig. 4). The latch will thus be actuated by its spring 187 into cooperation with the pin 147 (Fig. 12) on the pawl 45 so that when the latch 146 is actuated to release the pawl the latch 186 will prevent the pawl from cooperating with the ratchet 39. The differential mechanism for returning the carriage will thus not operate. At the end of a series of automatic perforating cycles when the machine stops perforating, the punch carriage continues to remain in punching position at the left hand side of the machine. In order to then return the carriage to its right hand position, a carriage return key 188 (Figs. 2, 3, 4) may be depressed. This key as seen in Fig. 4 is pivoted at 189 and is held in its normal upper position by a spring 190 and has fixed thereto an arm 191 connected to a link 192 which carries at its right hand end (see Fig. 12) a spring-pressed latching member 193 adapted to cooperate with pins 194 on the latching members 146 and 186. The actuation of the carriage return key will move the link 192 and latch 193 to the left removing the latches 146, 186 from cooperation with the pawl 45 permitting the latter to cooperate with the ratchet 39 to restore the carriage. The action of latch 193 in rocking latch 186 and rod 185 restores the arm 184 to the position of Fig. 21 in cooperation with the latching arm 182 which when the stop key 160 is released causing clockwise rotation of arm 163′ stretches the spring between arms 163, 182 so that the latter arm will move into cooperation with arm 184 when the latter is raised. When the automatic key is depressed and the link 169 (Figs. 26 and 32) moves downwardly a latch 195 pivoted at 196 to arm 108 and connected by spring 197 to link 169 will be moved from the position of Fig. 26 to that of Fig. 32 into cooperation with the bracket 109 on the carriage 18 so that when the latch arm 108 is temporarily removed from cooperation with bracket 109 at the end of each cycle of operation the carriage cannot be accidentally started in its movement toward the right. When the stop key is restored and the link 169 is again raised, the pin 198 engages the projection 199 on latch 195 and raises it out of cooperation with the bracket 109.

Restoration of punches

After the punching of a card has been effected and before the punches can again be set to punch a new card with a different setting, it is necessary to release the set punches from their locked positions. This may be effected by means of a bail 260 (Figs. 5 and 16) pivoted at 261 on the punch carriage and cooperating with the lower ends 73′ of the latch shutters 73. Fixed with respect to the bail 260 is an arm 262 (Figs. 16 and 27) having at its outer end a pin 263 adapted, when the punch carriage is in punching position, to lie just above a lever 264 pivoted at 265 to a bracket 266 carried by the frame 30 of the machine. The lever 264 is actuated by a spring 267 adapted to normally hold the lever with its left hand end against the shaft 29. One of the cam elements 125 carries a pin 268 which is adapted to engage the right hand end of lever 264 soon after punching has been effected and while the cams 125 are moving to their normal position. This rocks the lever 264 clockwise as viewed in Figs. 6 and 16, rocking the bail 260 upwardly to lift the shutters 73. The punches will then be returned by their springs 24 to normal position.

Gang punching

Where several cards are to be punched with the same data in certain columns the punches associated with such columns may be locked in set position after the first setting so that they will not be restored when the other punches are released for restoration. For this purpose an additional shutter 270 Figs. 5, 16 and 39) may be provided for each vertical column of punches. These shutters are provided with projections 271 adapted to cooperate with projections 272 on the punches 19. A spring 273 tends to push the shutter 270 downward to latching position and an arm 274 pivoted at 275 is provided with a projection 276 adapted to cooperate with a lateral projection 277 on the shutters 270 so that when the arm is moved in a clockwise direction as viewed in Fig. 16 it will raise the shutters 270 to inoperative or non-latching position. The parts may be locked in this position by the latching lever 278 cooperating with the arm 274. A spring 279 compressed between arm 274 and latch 278 holds the latch in operative position. By pressing downwardly on the latch 278 the arm 274 will be released permitting the spring 273 to move the corresponding shutter 270 downwardly into latching position with respect to the punches. After the first setting of the punches for a group of cards has been effected, all of those columns which are to be perforated alike in the several cards of a group to be punched may have their punches locked in the set position by depressing the corresponding levers 278 to release arm 274 as in Fig. 39. As shown in Fig. 29 a strip 280 may be provided with indications cooperating with arms 274 and the levers 278 showing which columns on the card correspond to the particular levers 278 and arms 274. When the shutters 270 cooperate with the punches 19 to latch them in set position the raising of shutters 73 at the end of each card punching will fail to permit the respective punches 19 to return to normal position. All punches not latched by shutters 270 on the other hand will return to their normal positions and those particular columns will be reset for each individual card. The raising of arm 274 from the position of Fig. 39 to that of Fig. 16 will release the punches from the control of shutters 270 so that when the shutters 73 are again raised, the punches will be restored to normal position for a new setting. The lever 278 will then snap over arm 274 latching it in the position of Fig. 16.

Card feed

The rotation of the cam shaft 13 also effects the feeding of the cards 200 from the supply magazine 201 (Fig. 6) to punching position 200′ and through to the position 200″ in the discharge stack 202. A back plate 203 is actuated by spring and gear mechanism commonly used in machines of this character to press against the back of the cards holding them against the guide members 203, 203″, 204 of the supply pocket 201. This mechanism need not be completely disclosed here but is indicated generally at 205. The member 203′ along with the member 206 at the bottom of the pocket serves to form the opening or throat 207 through which but one card is permitted to pass at a time. Slidably mounted for movement up and down on rods 208 (Figs. 2 and 6) is a cross head 209 carrying the card picker 210 which is connected at its upper opposite ends by links 211 to arms 212 fixed on a shaft 213 to which is also fixed a bell crank 214 actuated by a spring 215 which tends to raise the card picker 210 to the upper or normal position of Fig. 6. Also connected to the bell crank 214 is a link 216 bifurcated at its lower end to straddle shaft 13 for guidance. A follower 217 carried by the link 216 cooperates with a cam 218 fixed on shaft 13. The action of the cam thus raises link 216 and causes depression of the card picker 210 to move the card downwardly into cooperation with the feed rollers 219, 220. The feed rollers 220 (Figs. 6 and 34) are fixed on a shaft 221 carried by the frame member 222 which shaft carries fixed thereto a pinion 223 meshing with the gear 224 connected by a universal joint member 225 which in turn is connected to one of the drive gears 17. The feed rollers 219 on the other hand are fixed on a shaft 226 loose in the frame 222 and pressed by a spring 227 into cooperation with the rollers 220 so as to permit the card to enter between the rollers and cause the rollers to press against the card. The gear 224 is fixed on shaft 226. As soon as the card is engaged by the feed rollers 219, 220, it will be moved downwardly thereby into cooperation with the next set of feed rollers 228, 229 (Fig. 30) and the latter will continue to feed the cards downwardly into cooperation with another set of feed rollers 230, 231. The feed rollers 229, 231 are carried by the punch carriage 18 (see also Fig. 26) while the rollers 228, 230 (see Figs. 2 and 5) are mounted on shafts 232, 233 mounted in curved slots 234, 235 in an arm 236 at one end and the frame plate 30 at the other end. The slots 234, 235 are radially disposed with respect to the shaft 237 which carries the driving gear 17. Arms 238 on each end of shafts 232, 233 are connected to arms 239 loose on shaft 240 and eccentrically connected at 239a (Fig. 7) to arms 239b fixed on shaft 240. Also fixed on shaft 240 is an arm 241 (see Fig. 6) connected at its opposite end to a link 242 which straddles shaft 13 and carries at its lower end a follower 243 cooperating with a cam 244 on shaft 13. Fig. 6 shows the parts in their normal positions with the feed rollers 228, 230 in their outer positions as in Figs. 5 and 6 adapted to permit the carriage to move laterally. After the carriage has reached its punching position and the cam shaft 13 commences to operate, the follower 243 is permitted to move upwardly following the cam 244 by the action of springs 245 which move the feed rollers 228, 230 into cooperation with the card in the position 200′ adjacent to the rollers 229, 231. Adjustment of the eccentric connection 239a serves to control the pressure of the feed rollers on the cards. The feed rollers 228, 230 whether in their inner or outer position are constantly driven by gears 246, 247 which mesh with a gear 248 (see Fig. 2), the latter gear being on a shaft 249 with one of the drive gears 17. As shown in Fig. 6 the highest position of the cam 244 serves to move the rollers 228, 230 to their outer position to permit the punch carriage to move. The lowest portion 244′ of the cam permits the rollers to cooperate with the card while feeding and the intermediate portion 244″ of the cam serves to remove the pressure of the rollers from the card while the latter is at a standstill being punched. When the card reaches punching position it will be stopped there by a stop member 250 (Figs. 5 and 6). This stop is carried by arms 251 pivoted at 252. A spring 253 (Fig. 6) is provided to normally move the stop 250 toward the right as viewed in Figs. 5 and 6 under the card. Also connected to one of the arms 251 is a link 254 (Figs. 3 and 6) straddling shaft 13 and provided with a follower 255 cooperating with a cam 256 on the shaft 13 for operation to stop a card being fed in and to release a card which is to be fed out.

*Stacking the cards*

Referring to Fig. 6 means are provided for pressing the cards into the position shown at 200″ in the lower pocket 202 after they have been fed to this pocket by the feed rollers. This means comprises an arm 466 mounted to rock about an axis 467 and having fixed thereto an arm 468 connected to a cam follower arm 469 bifurcated at its upper end and straddling the cam shaft 13 and provided with a roller 470 cooperating with a cam 471 fixed on the shaft 13. A spring 472 serves to raise the arm 469 to hold the roller 470 in cooperation with its cam. After the card has been fed into the pocket 202 the cam actuates the parts to rock the arm 466 with the card to the position shown. The arm 466 then rocks clockwise to its normal position before the next card is fed into the pocket.

*Back spacing of punch carriage*

If the operator in setting up the punches effects an incorrect setting in any particular column, he may step the carriage backward a column to effect a setting of the correct punch which by reason of the operation of the latching shutter 73 will release the incorrectly set punch when the correct punch is set. The mechanism for stepping the carriage backward is shown in Figs. 2, 4, 33 and 41 and comprises a lever 285 rotatably carried by a bracket 286 fixed to the punch carriage 18. An upwardly extending arm 287 is connected to a pawl 288 having a lateral projection adapted to cooperate with the teeth of a ratchet bar 289 fixed to the frame of the machine. A guide and stop member 290 fixed on the carriage is provided with a cam portion 291 which when the parts are in normal position holds the pawl out of cooperation with the ratchet bar and against the action of a spring 292. By moving the lever 285 toward the right as viewed in Fig. 33, rotating it about its pivot, the pawl 288 will be moved to the left and will be permitted to ride along the cam edge 291 into cooperation with the ratchet bar 289 engaging a tooth thereof. Continued turning of the lever 285 will move the carriage 18 toward the right until the left end of pawl 288 engages the left side of the opening in the guide 290. This operation will step the punch carriage one step backward or to the right. It will also be noted that by pushing the lever 285 further toward the right the punch carriage may be carried any desired distance irrespective of the cooperation between the pawl 288 and the ratchet bar 289. A spring 293 may be provided to turn the lever 285 to normal position.

The carriage may also be entirely released from the escapement device so that it may be moved in either direction by means of a link 294 (Figs. 41 and 43) connected to the rack bar 46 and to a lever 295 pivoted at 296 and normally held down by a spring 297. By depressing the forward end 298 of the lever 295 the rack 46 will thus be lifted out of engagement with the ratchet wheel 49 (Fig. 10) so that the carriage may be moved in either direction.

Column skip mechanism

In the setting up of the punches it is sometimes desired to skip certain columns, either because the punches associated with these columns have been locked for repeat or gang punching or because no punchings are to be effected in these columns on the card. This may be effected by the depression of a tabulator key or by an adjustable clip. Presuming the device is to be actuated manually the key 299 (Figs. 8 and 23) will be depressed. This key is pivotally mounted on shaft 83 and is provided with an upper extension 301 actuated by a spring 302 to hold the key in its upper or normal position. A bell crank 303 pivoted at 304 is connected by pin and slot at 305 to the tabulator key 299. The upper end of the bell crank carries a spring controlled by-pass 306 adapted to cooperate with a lever 307 (see also Fig. 24). When the key 299 is depressed the bell crank 303 will be rocked counterclockwise as viewed in Fig. 23 so that the action of the by-pass 306 upon the lever 307 will serve to raise the latter, rocking it about its pivotal support 308 on a projection 309 of bracket 154 mounted on a fixed portion 155 of the machine (Fig. 8). A depending latching arm 311 (Fig. 24) of lever 307 normally latches the arm 312 in its lower position as viewed in Figs. 23 and 24, so that when the lever 307 is rocked upwardly the latch 311 releases the arm 312 and permits it to be rocked clockwise by its spring 313. The arm 312 is fixed on a shaft 314. The opposite end of this shaft (Figs. 8 and 23) has fixed thereto a latch 315 cooperating with a clutch pawl 316 carried by a member 317 fixed with respect to a cam 318. The actuation then of the tabulator key serves to release the clutch pawl 316 permitting it to be actuated by its spring 319 into cooperation with a clutch ratchet 320 fixed with respect to a gear 321 meshing with the gear 322, fixed on shaft 9 so that the gear 321 is constantly rotating. Thus the cam 318 will be caused to rotate and through the follower 323 will move the arm 324 to the left as viewed in Fig. 23, rocking the arm 325 counterclockwise. This arm is fixed on the shaft 83 and rocks the latter counterclockwise. The other end of shaft 83 has fixed thereto an upwardly extending arm 326 (Figs. 10 and 21) adapted to cooperate with an arm 327 pivoted at 328 with the frame 86 but rotatable independently thereof. The arm 327 reaches over and lies under the teeth of the rack 46 so that the operation of the arm 327 serves to raise the rack out of cooperation with the ratchet wheel 49 of the escapement. This will free the punch carriage and permit it to be actuated by the tape 34 (Fig. 26) to move the carriage toward the left. In order to stop the movement of the carriage after it has skipped the desired number of columns, a tabulator stop clip 329 (Fig. 19) may be adjusted on the notched bar 330 (see Figs. 2 and 44). When the arm 326 is rocked to release the carriage for movement, an arm 331 (Figs. 10 and 21) also fixed on the shaft 83 rocks counterclockwise as viewed in Fig. 21 and pulls the link 332 downwardly. This link as shown in Fig. 44 is connected to a stop arm 333 pivoted at 334 to a fixed portion of the frame 155. This will raise the projection 335 into the path of the clip 329 so that when the clip engages the stop it will arrest the carriage in its movement toward the left. A rebound stop member 336 pivotally carried by the projection 309 of bracket 154 and actuated by the spring 337 will be cammed downwardly by the clip 329 and will spring upwardly in back of the clip to prevent the carriage from rebounding when the clip strikes the stop projection 335.

After the cam 318 has completed its revolution, the carriage having stopped and the key 299 being released, the spring 302 will restore the key to normal position, and through pin 342 (Fig. 23) acting on arm 325, will rock shaft 83 clockwise. This will raise link 332 (Figs. 21 and 44) and restore stops 335 and 336 to their normal or lowered positions.

*Automatic releasing of the carriage skip mechanism*

Where certain of the punches have been locked in set position so that they will not be released by the operation of the shutter 73, the carriage may be caused to automatically skip over these columns when the first one thereof is reached in the setting up of the punches. To effect this a clip 338 (Fig. 20) may be connected on the notched bar 330 in position to engage a by-pass 339 (Fig. 24) carried on the lever 307. As the carriage moves to the left during punch setting operations the clip 338 engages the by-pass 339 and cams it downwardly rocking the latch 311 out of cooperation with arm 312. In doing this the by-pass 339 is prevented from rocking to the left by reason of the pin 340 cooperating with a shoulder on the lever 307. When the carriage is subsequently returned to the right the clip 338 will engage the left hand side of the by-pass 339 rocking it against the action of its spring 341 to permit the carriage to move on. The arm 312 will, when released, rock clockwise (Fig. 23) as previously described and through the operation of the clutch, will cause shaft 83 to rock counterclockwise thus releasing the carriage as described for the skipping operation. The carriage will be stopped by a clip 329 as already described. The operation of arm 325 in this instance will, through cooperation with a pin 342 (Fig. 23) fixed on the arm 301 of key 229, cause the tabulator key to be rocked downwardly to operate the interlocking elements hereinafter to be described so that others of the keys may not be depressed during the skipping operation of the machine. After the clutch pawl 316 has been released to cause the cam 318 to rotate, a cam roller 343 (Figs. 23 and 25) carried by cam 318 will, during the rotation of the latter, engage an arm 344 integral with the latching arm 315 and will rock the latching arm back into operative position. The arm 312 being fixed with respect to the arm 315 will then be rocked against the action of its spring into normal or latching position with respect to latch 311. Thus after the cam 318 has completed one revolution the clutch pawl 316 will engage the latch stop 315 and be disengaged thereby from the ratchet 320. The end of member 317 will also strike the stop 315 as shown in Fig. 25 and this will stop the parts in this position. In order to hold the parts in this de-clutched position a latch 345 loosely mountned at 314 and actuated by a spring 346 is provided to cooperate with the member 317 to prevent rebound or retrograde movement of the parts.

*Carriage return stop*

When the punch carriage is returned to the right side of the machine as previously described it may be stopped in position so that setting of the punches may be commenced with the first column of punches, or, by the setting of a stop clip it may be stopped in position to commence the setting of the punches in any other column. Thus if gang punching is being effected in the first ten columns of a card and these particular punches have been locked in set position, the carriage may be set to stop at the eleventh column so that the setting of punches will commence in that column. The stop clip for controlling the stopping position of the carriage is shown at 347 in Fig. 18 in detail and is shown mounted on the notched bar 330 in Fig. 45. Here it is shown in position to stop the carriage to commence setting in the first column. When the carriage is moved to the right the stop 347 engages a stopping pawl 348 pivoted at 153 to the bar 151. A spring 349 cooperating with the opposite end of pawl 348 rocks the latter clockwise as viewed in Fig. 45 into its upper or operative position. Should the stop 347 be attached at an intermediate point to the notched bar 330 and it is desired after the carriage has been stopped to move it farther to the right, the stop pawl 348 may be lowered to permit the clip 347 to pass by for this purpose. To this effect the stop pawl 348 is provided with a depending projection 350 reaching into a slot 351 in a slide 352' mounted on the member 151. A lever 352 (Figs. 1 and 45) pivotally mounted at 353 to the member 151 is also provided with a depending projection 354 cooperating with a shoulder 355 (see also Fig. 8) on the slide 352. Rocking of the lever 352 counterclockwise as seen in Fig. 45, thus moves the slide 352 to the right rocking the stop bar 348 out of cooperation with the stop clip 347 and the punch carriage may then be moved farther to the right. When the stop clip 347 is in an intermediate position for stopping the punch carriage before it reaches its full right hand position, the pin 149 (Fig. 2) will not serve to move the bar 151 to the right to de-clutch the carriage return mechanism but the stop clip 347 in engaging the pawl 348 will in this instance move the pawl and bar 151 to the right and the cam surface 157 will effect the de-clutching of the carriage return mechanism as previously described.

*Signal of position of punch carriage*

When the punch for the last or any other predetermined column is set or is about to be set a signal may be sounded to warn the operator of this fact. In the present instance I have shown a bell for this purpose. The bell 356 (Figs. 8, 9, and 44) is carried by the frame 155 and is adapted to be struck by a hammer 357. The hammer is pivotally mounted on a lever 358 which in turn is pivotally carried by a bracket 359 and is adapted to be engaged by a lever 360 (Fig. 44) to be actuated by a clip 361 (Fig. 17) adapted to be mounted on the notched bar 330 (Fig. 23). The punch carriage when moving to the left with the notched bar 330 will cause the clip 361 to engage the lever 360 rocking the latter counterclockwise as viewed in Fig. 44 or to the right as viewed in Fig. 9 rocking the lever 358 counterclockwise about its pivot. Then when the clip passes beyond the lever 360 releasing the latter a spring 362 (Figs. 9 and 44) which will have been stretched will tend to rock the lever 358 clockwise about its pivot with the hammer 357 and will cause the hammer to strike the bell 356.

*Punching a predetermined number of cards*

Figure 1:
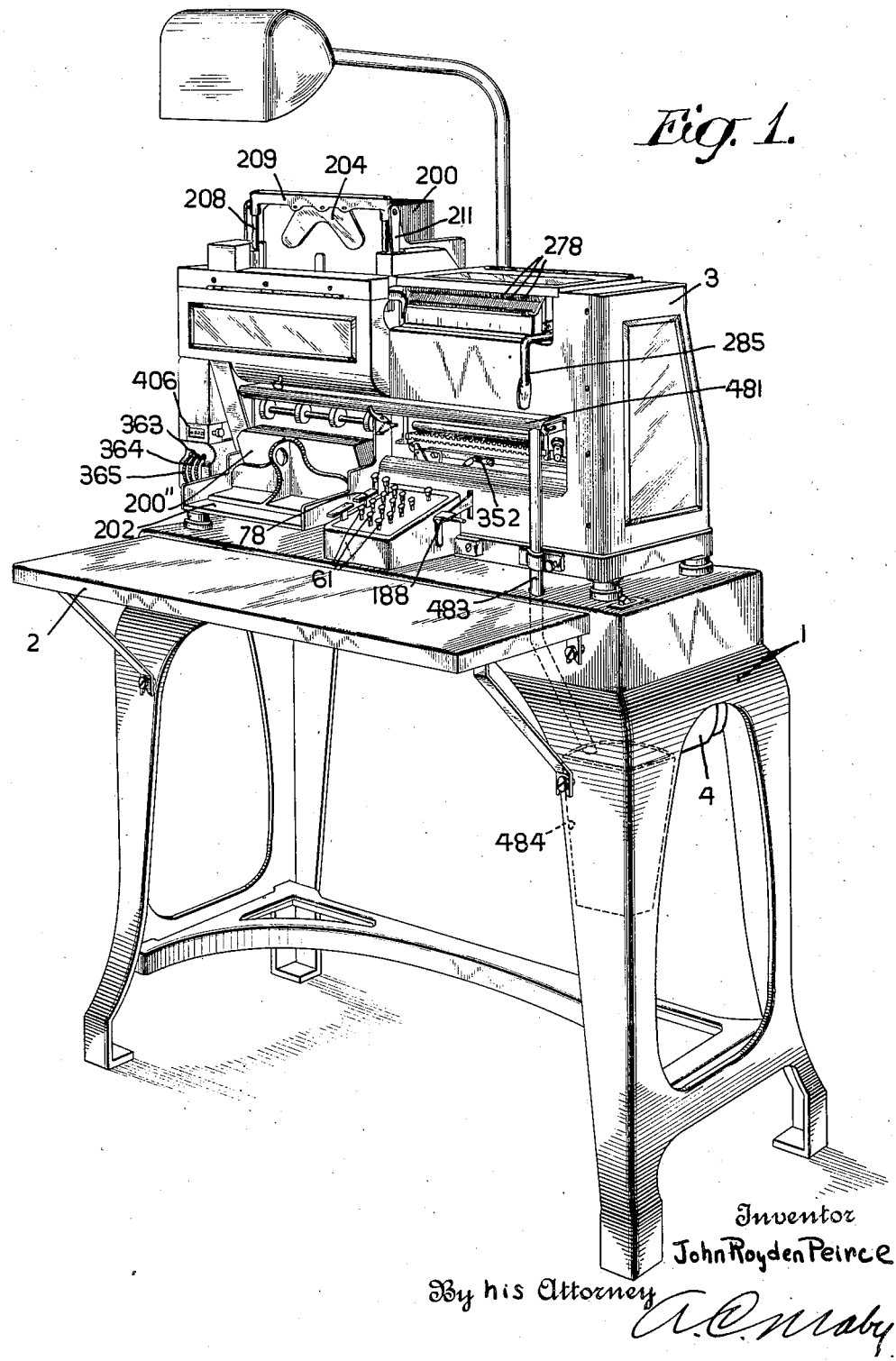

Mechanism is provided whereby the machine may be set so that a predetermined number of cards may be automatically punched under control of a single setting of the punches, and the machine stopped at the end of such punching. The mechanism for this purpose is shown in Figs. 1 and 2 and comprises in the present instance three rotatable gear wheels 363, 364, and 365. As shown in Fig. 47, these gear wheels mesh with gears 363', 364' and 365'. Indication drums 366 are fixed to each of the wheels 363, 364 and 365 to indicate their setting positions. As shown in Figs. 47 and 48 each of the gears 363', 364' and 365' has affixed thereto a star wheel 367 cooperating with a spring 368 which is adapted to hold the wheel against accidental rotation. Also affixed to each of these gears is a disc 369 having at its periphery a notch 370. An actuating ratchet wheel 371 is also provided fixed to each of the gears 363', 364' and 365'. The ratchets 371 are provided with ten teeth and each has a deep notch 372 for carrying purposes. Three pawls 373 fixed with respect to each other are rotatably mounted at 374 on arms 375 and 376 which are in turn loosely mounted on the central shaft 377 on which the gears 363', 364' and 365' are also loosely mounted. Connected to the arm 376 is a link 378 adapted to reciprocate to the right and left as viewed in Figs. 46, 47 and 48 to cause the pawls 373 to actuate one or more of the ratchets 371 one tooth space for each movement of the pawls to the left. The lengths of the pawls 373 are progressively greater so that normally the units pawl will engage its wheel for actuation; then when the units wheel is passing from the nine position to the ten position the pawl engages in the deep notch 372 and permits the tens pawl to move into cooperation with the tens ratchet wheel to actuate the latter one notch. Similarly when the tens wheel is moving through its tenth position its pawl and the units pawl will reach into the deep notches 372 and permit the hundreds pawl to engage its ratchet wheel to carry into the latter. This mechanism is well known in the calculating machine art and will therefore not be dealt with in any greater detail here.

The pawls 373 may be thrown in or out of operating position with respect to their ratchets 371 by means of a lever 379 (Fig. 46) pivoted at 377 and provided with a cam periphery 380 adapted to cooperate with a pin 381 fixed to the pawls 373. In the position shown in Fig. 46 when the link 378 moves to the left, rocking the arms 375, 376 with the pawls 373 the pin 381 will ride from the higher portion of the periphery of the member 379 to the lower portion of the periphery causing the pawls to move into cooperation with the ratchet or ratchets to actuate the latter. As the parts return, the pawls will ride out of cooperation with the ratchets through the action of pin 381 on the periphery of the member 379. In order to render the device inoperative the member 379 is depressed so that the notch 382 will cooperate with the latching pin 383 in which position the pin 381 will continue through its movements to cooperate with the high portion of the periphery of member 379 and the pawls 373 will thus not move into engagement with ratchets 371 so that the latter will not be actuated.

Each of the discs 369 as stated is provided with a notch 370. When these notches are in alignment as in Fig. 48 a member 384 will be free to move to the left into the notches. The notches will be in such alignment when the indicator drums 360 are all in their zero positions. By turning the gear wheels 363, 364 and 365 to present any given number in the reading line 385 (Fig. 47) the link 378 will be required to move to the left a corresponding number of times in order to return the discs 369 to position where the slots 370 will align with the member 384. The link 378 moves once to the left for each card punched so that a number of cards corresponding to the set up will be punched before the notches 370 align with the member 384. When this alignment takes place the member 384 will move to the left and cause the machine to stop.

In Fig. 7 the cam shaft 13 is shown as carrying a cam 386 with which follower arms 387, 388 cooperate. As the cam turns the follower arm 388 first rocks into the low periphery and through its depending arm 388' connected to the link 378 permits the latter to be moved to the right by its spring 389. In Figs. 46, 47 and 48 this movement is to the left and actuates the pawls 373. Immediately thereafter the follower 387 (Fig. 7) enters the low periphery of the cam and permits its depending arm 387' to swing to the right. This arm 387' has resilient pin and slot connection at 390 with a link 391 to move the latter to the right as viewed in Fig. 7 or to the left as viewed in Figs. 46, 47 and 48. This link is connected to the member 384 so that during each cycle of operation the link 391 moves the member 384 into co-operation with the discs 369. Unless the notches 370 are in alignment as in Fig. 48 the member 384 will be stopped by the discs and the spring connection at 390 (Figs. 7 and 36) will yield. When the notches are in alignment the member 384 will be permitted to move its full distance to the left as viewed in Figs. 46, 47, and 48. The depending arm 392 integral with member 384 will then also move to the left as viewed in Fig. 46 and will engage and actuate the lever 393 (Figs. 31 and 46). Lever 393 will then be rocked counterclockwise about its pivot 394 (Fig. 31), rocking a lever 395 clockwise about its pivot 396 against the action of spring 397. An upward projection 398 on lever 395 will then engage the pin 181 (Figs. 31 and 46) on the latch member 173 which normally cooperates with pin 174 on the automatic key 160 (Fig. 21). The latch 173 will thus be moved out of cooperation with the key 160 and the latter will be permitted to rise to bring about stoppage of the machine as previously described.

A projection 399 also on lever 395 will at the same time rock a bell crank lever 400 (Figs. 8, 21, 46 and 31) counterclockwise as viewed in Fig. 46 against the action of its spring 401, out of latching cooperation with an arm 402 to permit the spring 403 to rock the arm 402 clockwise about its pivot as viewed in Figs. 46 and 21. This will cause the shoulder 404 to cooperate with a pin 405 on the operating key 78 to prevent the depression of the latter. This will prevent the restarting of the machine by the operator after it has been brought to an automatic stop, to warn the operator to ascertain the cause of stoppage before the machine is again started. To again operate the machine the arm 402 may be pulled to the left as viewed in Fig. 21 to release the operating key. The arm will then be latched in this position by the latching member 400.

Card counter

In Figs. 1, 2 and 3 a counter 406 is shown. This counter may be reset by the usual resetting knob 407. It is actuated through a link 408 which as shown in Fig. 46 is connected to the member 376 at 409 and is actuated when the link 378 moves to the left to actuate the pawls 373. Thus during each cycle of operation of the machine the counter will, under normal conditions, be actuated to count one card as having been perforated.

Stopping the machine when cards fail

In order to stop the machine when the supply magazine becomes empty or when the cards otherwise fail to feed to punching position a finger 410 (Fig. 36) is shown pivotally mounted at 411 to the frame of the machine and fixed with respect to an arm 412 connected to a link 413. A spring 414 normally acts to rock the finger 410 into the plane of a card 200'. Thus whenever a card is fed to punching position it will engage the finger 410 and rock it counterclockwise as viewed in Fig. 36 depressing the link 413. If on the other hand a card fails to feed to punching position, the finger 410 fails to rock and the spring 414 holds the link 413 in its upper position where a lateral projection 415 will engage in a slot 416 in the link 378 preventing the latter from being actuated to the right as viewed in Fig. 36. Under normal operation when the link 378 does move to the right a pin 417 carried thereby engages the upward extension 418 of a latching member 419 rocking the latter about its pivot into locking engagement with a pin 420 on a link 421. This link has pin and slot connection at 422 with the depending arm 387'. A spring 423 tends to pull the link 421 toward the right whenever the arm 387' moves in this direction, but when the link 378 has been permitted to move to the right raising the latching member 419 into the position of Fig. 36, the movement of the link 421 to the right is prevented. When, however, by reason of the failure of a card to feed to punching position the link 378 is prevented from moving to the right and the latching member 419 is not rocked into latching position but remains out of cooperation with pin 420 as in Fig. 7. Then when the depending arm 387' swings to the right the link 421 will also move to the right engaging the lever 393, rocking the latter counterclockwise as seen in Fig. 31 and this as we have seen stops the machine.

When the operating key is depressed to cause the punch carriage to move to punching position, if no card is then fed to the punches, it is desired to prevent the carriage from being returned and the punch setting from being destroyed. Thus, when the finger 410 (Fig. 36) raises link 413 and prevents link 378 from moving to the right, the latch 419 will remain in the position of Fig. 7 and the slide 421 will move to the right as described. A pin 518 fixed to slide 421 will then rock arm 519 counterclockwise (Figs. 7 and 36) against the action of spring 520. Arm 519 is fixed on shaft 521 on which is also fixed an arm 522 (Figs. 5 and 21). Here the shaft rocks counterclockwise and arm 522 acting upon pin 523 fixed to arm 182 rocks the latter away from the arm 184 permitting shaft 185 to rock and latch 186 (Fig. 12) to engage pin 147. When latch 146 releases pin 147 the latch 186 then prevents pawl 45 from cooperating with ratchet 39. The punch carriage will then not be restored until cards are placed in the supply magazine and a card has been punched in accordance with the existing punch setting.

*Punching serial numbers*

Means are provided whereby certain columns on a group of cards being punched may be used for the punching of numbers in the cards in which the setting of the punches is changed for each punching operation so that the punching of the successive cards will change serially as the machine operates. This device is disclosed in Figs. 3, 40, 41, 42 and 43 and includes the supporting frame 425 supported at its lower end on a shaft 426 and being adapted to rock on this shaft. In the frame 425 are several slide members 427 mounted for up and down movement in the frame. A spring 428 is connected between each slide and the frame to normally tend to raise the slide to its uppermost position. In the present instance I have shown five of these slides for controlling the punching in five columns on the cards. Each slide is provided with an upper and a lower projection 429, 430 respectively. The lower end of each slide has a pin 431 cooperating with a double cam member 432 mounted on a shaft 433 and fixed with respect to a gear wheel 434. Gear 434 is in turn meshed with a larger gear 435 mounted on shaft 436 and fixed with respect to a ratchet wheel 437. Five actuating ratchet pawls 438 are provided for turning the ratchet wheels 437 and holding latches 439 are provided to prevent the ratchets 437 from turning backward. The ratchet wheels 437 are each provided with twenty teeth and therefore have two deep or carrying notches 440. The pawls 438 are pivotally carried by arms 441 and are actuated by spring 442 into cooperation with the ratchets. The pawls 438 are similar to the pawls 373 of Fig. 49 and operate in a similar manner. Arms 441 are mounted on shaft 436 and have fixed thereto an arm 443 having a slot 444 through which a shaft 445 passes. This shaft is fixed to an arm 446 at one end and to an arm 446' at the other end, the two arms being fixed on shaft 426. Spring 446'' serves to hold the parts in upper position with rod 445 in the upper end of slot 444. The arm 446 has resilient pin and slot connection at 447 with a member 448 which is bifurcated at its upper end and straddles the shaft 13 for support and is provided with a cam follower 449 cooperating with the cam 450 fixed on the cam shaft 13. Once during each cycle of operation of the machine cam 450 depresses the member 448 and rocks arm 446 clockwise as viewed in Fig. 41 and causes counterclockwise movement of arm 443 and arms 441 with the ratchets 438. By this operation the units ratchet 437 will be actuated one step for each cycle of operation of the machine. During the tenth step the pawl 438 will drop into the deep notch 440 and permit the tens pawl 448 to engage and actuate its ratchet 437. Similarly when the tens ratchet 437 is to be moved its tenth step its pawl 438 will drop into a deep notch 440 at the same time that the units pawl falls into such a deep notch and the hundreds pawl will then engage and actuate the hundreds ratchet 437 one step. In this manner the units cam 432 will be stepped around ten steps and during the tenth step the tens cam 432 will be actuated one step and when the tens cam is taking its tenth step the hundreds cam will in like manner be actuated one step and so forth. Presuming the parts to be set at zero the pin 431 at the lower end of each slide 427 will cooperate with the portion of the cam 432 designated 0. In this position the upper projection 429 on the slide will be in horizontal alignment with the 0 punch and the lower projection 430 will register with the space between the 4 and 5 punches. When the machine turns through one cycle of operation and the cam 432 turns one step the pin 431 will be cammed downwardly and will be held in position by the portion of the cam designated 1. The upper projection 429 will thus be moved from the 0 punch to the 1 punch and so forth until the portion designated 4 on the cam has controlled the position of the pin 431 to cause the projection 429 to register with the 4 punch. During the next cycle of operation the pin 431 will ride off from the 4 portion of the cam and be raised by spring 428 to the portion designated 5. In this position the lower projection 430 of slide 427 will register with the 5 punch and the upper projection 429 will register with the space between the 0 and 1 punches. In Fig. 43 the pin 431 is shown cooperating with the portion of the cam designated 8 and the lower projection 430 is shown registering with the 8 punch, while the upper projection 429 is shown between the 3 and 4 punches. When the setting of the slides takes place the frame 425 will be in the inclined position shown in Fig. 41, the spring 451 connected between the frame 425 and a fixed pin 452 being provided to move the frame to this position when the cam 450 is in the position shown in Fig. 41. During the operation of the machine the cam 450' cooperating with the frame 425 as shown at 453 (Fig. 43) rocks the frame toward the left into the position shown in Fig. 43 causing the projections 429 or 430 to actuate one of the punches, moving the latter to the left. This serves to set the punch where it becomes latched by the latching slides previously described. At the end of the punching cycle of operation the punches set by the slides 427 are released in the usual manner and for the next punching operation the punches are again set by the slides 427 with the serial change brought about by the changing of the position of one or more of the slides 427 by the cams 432 and associated mechanisms. Also loosely mounted on shaft 426 is a frame 454 to which the pin 452 is fixed. The frame 454 is adapted to be locked in the notched bar 455 (Fig. 40) and to be held down in cooperation with such a bar by a slide 456 having inclined slots 457 cooperating with supporting studs 458. By moving the slide 456 to the right as viewed in Fig. 40 the slide will be raised, releasing the frame 454 to permit the latter to be raised out of cooperation with the notched member 455. The frame 454 may then be slid along the shaft 426 carrying with it the frame 425 and the slides 427, cams 432, ratchets 437 and associated mechanism. In this way the serial numbering device may be moved into cooperation with any group of five adjacent vertical rows of punches within a definite range. In the present instance as shown in Fig. 40 the frame 450 and associated parts may be moved to the left as far as column 23 so that according to the present disclosure, serial numbering of cards may be effected in any group of five columns up to and including the twenty-third column on the card. Obviously if desired, the device may be made movable across the entire width of the punches so that serial numbering may be effected on any portion of the card.

It is also possible to lock one or more of the slides 427 out of operation. For this purpose latching pawls 459 may be provided to cooperate with notches 460 in the slides 427. Springs 461 serve to rock the pawls into cooperation with their respective slides. Normally as shown in Fig. 43, the notches 460 are above the latching pawls 459 and do not cooperate therewith. By manually depressing any one or more of the slides 427 the notches 460 may be moved into register with the latching pawls 459 where the latter will operate to hold the slides in this lowered position. In such position the projections 429, 430 will not register with any of the punches so that when the frame 425 rocks the punches will not be set.

In the operation of the punching machine to punch serial numbers in cards it may be desired from time to time to interrupt the operation to perforate stray cards not belonging to the serial group. This may be done without affecting the setting of the serial numbers by locking the serial number device against operation during the time that the machine is being used for other punching and releasing the device again when operation on the group being serially punched is again resumed. Such a latching device is shown in Fig. 43 and may comprise an arm 462 adapted to be moved under the rod 445. A link 463 connected to the latch may be locked in either of two positions by notches 464 cooperating with the member 465. In the position shown in Fig. 43 the arms 446, 446' are free to rock downwardly but when the latch 462 is moved to the left it will prevent the downward movement of arms 446, 446' and the rod 445. Thus the arm 443 and the pawls 438 will not be actuated. When the parts are so locked the spring 447' will yield when the cam 450 depresses the member 448.

Should the machine be stopped by the failure of a card to feed, the stoppage of course takes place at the end of the cycle of operation of the machine. As no card will be perforated during this cycle means are provided for preventing the setting of the serial numbering device from being changed. This means comprises a loosely pivoted latch 513 (Figs. 7 and 36) having a pin 514 connected by a spring 515 to a pin 516 on the link 378. The spring normally holds latch 513 against the pin 516, and with the link 378 in its left hand position as in Fig. 7, the latch cooperates with an arm 517 fixed on shaft 426 (see also Fig. 43). This shaft normally rocks counterclockwise as viewed in Figs. 7 and 36 or clockwise as viewed in Figs. 41 and 43 after link 378 has moved to right. Latch 513 will then be disengaged from arm 517 and shaft 426 will be free to rock. But if link 378 is prevented from moving to the right by the failure of finger 410 to encounter a card the latch 513 will hold arm 517 and prevent shaft 426 from rocking when link 448 (Fig. 41) descends and the pawls 438 will not operate to change the position of any of the slides 427.

Key interlock

In order to prevent the actuation of a key while some other key is in depressed position, interlocking means are provided. Referring to Fig. 45 this means comprises a plurality of depending arms 473 pivoted at 474 and having enlarged lower ends 475. The ends 475 cooperate with each other and when any one of the arms 473 is rocked to one side or the other it moves all of the others on the side to which it is moved, in the same direction. The arms 62 of the keys are disposed between the arms 473 so that depression of any of the keys will engage the ends 475 spreading the arms 473 at this point. If another key is then depressed it will tend to spread the arms 473 but cannot do so and the key therefore cannot be depressed. The carriage return key 188 shown in Fig. 4 may be connected to this interlocking device by means of a link 476 connected through a slot 477 in the casing 478 to an arm 479 pivoted at 480 to the casing and cooperating at its opposite end with the arms 473.

When the operating key 78 (Figs. 8 and 45) is depressed it engages an inclined edge 505 of a slidable shutter 506, moving the latter to the right where it will be held by a detent latch 507. In such position the projections 508 will prevent depression of the other keys. When the punch carriage returns to the right after a card has been perforated, the pin 509 will be caused to engage a lever 510 pivoted at 511 and connected by spring 512 to the slide 506. Lever 510 will thus be rocked clockwise and will move the slide 506 back to normal position.

Disc or chip conveyor

Means are provided for receiving the small discs or chips that are punched from the cards in order to prevent these from being scattered in the machine or from falling upon the floor. This means is shown as comprising a trough 481 (see Figs. 2, 3, and 5) disposed across the front of the machine near the lower edge of the front die plate 22. As the punches reach through the card into the die plate 22 pushing the discs through the plate the latter will fall into the trough 481. A coil spring or wire 482 lying within the trough is rotated to carry the discs from the left side of the machine as viewed in Fig. 2 toward the right. At the right end of the trough is a tube 483 into which the discs fall on reaching this end and by which they are conducted into a container 484 (Fig. 1) attached to the inside of the base 1 of the machine. For rotating the spring 482 the left end thereof is connected through an extension 485 to a pulley wheel 486 which in turn is connected by a belt 487 to a pulley wheel 488 on the shaft 13.

Space key

The space key 525 (Figs. 3, 8) is connected through a link 526 (Fig. 16) to an arm 527 fixed to the bail 58 (see also Fig. 5). Depression of the key rocks the bail and actuates the escapement member 54 to permit the punch carriage to advance one step to skip a column of punches when no punch is to be set up by the actuation of one of the setting keys.

Operation

The punches are mounted in a carriage and are arranged in vertical rows of twelve punches to each row. In the present instance there are 45 such rows. There is one vertical row of twelve pins arranged in the back of the punch carriage. These pins are connected to the setting keys and are adapted when a key is depressed to set one of the punches. The carriage is first moved to its right hand position. In this position the first column of punches registers with the column of setting pins. When a key is depressed a corresponding punch will be set and latched in position to punch a card. The carriage then escapes bringing the second vertical row of punches into register with the setting pins. The next depression of a key will then set the corresponding punch in the second column. In this way one punch in each of the 45 rows may be set for the punching of a card. The machine may be so set that if no punching is to be effected in certain columns of a card, the corresponding columns of punches will skip past the setting pins so that no setting in such columns will take place. After all of the desired punches have been set an operating key may then be depressed. This releases the punch carriage and permits it to move in its extreme left hand position in the machine ready to perforate a card. When the carriage reaches this position the card feeding mechanism is automatically brought into operation. A card is then fed from the supply magazine into position between the die plates mounted on the punch carriage. The punches are then all moved toward the card. Those punches which have been set slightly in advance of the other punches will cut through the card while all the rest of the punches do not move far enough to punch the card. The punches are then withdrawn and the card is fed out to the discharge magazine. The carriage then returns to the right hand position ready for a new setting of punches.

Means are provided whereby the carriage instead of moving all the way to its right hand position may be stopped at any desired point so that the new setting of punches may be commenced in any desired column. When the carriage is returned from punching position to receive a new punch setting, those punches that were set for the previous punching operation are all restored to normal position by the raising of all of the latches of which there is one for each column. If certain punches are to be used repeatedly to punch group numbers or dates, those punches upon being set for the first time may be latched in set position so that the operator need not reset them for every card punching. Special latches are provided for this purpose. Upon making the first punch setting the operator latches all of those punches to be used for repeat punching in set position. When the carriage is returned after a punching operation all of the punches will be released except those that have been latched with the extra latches. The columns in which the punches are latched for group punching may be set to skip past the setting pins.

A device is also provided for effecting punching of serial numbers on the card. The columns of punches that are used for serial numbering are set to skip past the setting pins so that no key controlled setting is effected when setting the rest of the punches. When the carriage is released and moves to punching position at the left of the machine, before the punches are actuated a device having projections is automatically moved against the punches and the projections set the necessary punches for the serial numbering. As soon as this setting has been effected the punches are then pressed through the card. These serial numbering devices comprise several slides one for each column in which serial numbering is to be effected. The slides are controlled by a counting device which advances one unit for each punching operation of the machine. Thus a projection on a slide in the units order advances one step for each card so as to change the punch after each punching operation. After having set the zero punch the units slide will then be returned to position to effect the setting of the "1" punch and at this time the tens slide will be advanced one step and so on.

I claim:—

1. In a perforating machine, a plurality of rows of punches, means for selectively setting a punch in each row for operation, means for latching the set punches in set position, means for causing said latching means to release the punches after a predetermined operation of the machine and additional latching means for latching the punches in set position independently of said first named latching means.

2. In a perforating machine, a plurality of punches, means for selectively setting certain of said punches for perforating a record, means automatically brought into operation for latching the set punches in set position, means for automatically releasing the punches after predetermined operations of the machine and additional latching means for holding set punches against the releasing operation of said releasing means.

3. In a record perforating machine, a carriage, a plurality of punches mounted on said carriage, means tending to move the carriage in one direction, step by step control means normally operative to control the movement of the carriage in said direction, speed governing means adapted to control the speed of movement of the carriage in said direction, means for bringing said speed control means into operation and for simultaneously rendering said step by step means inoperative and additional means for rendering said step by step control means inoperative without rendering said speed control means operative.

4. In a record perforating machine, means for automatically perforating records, means for automatically feeding records successively to and from said perforating means, means for counting the records perforated, means for locking said counting means against operation during continued feeding and perforating operations without disturbing the condition of the counting means.

5. In a record perforating machine, a plurality of rows of punches, manually operable keys for selecting certain of said punches for operation and means for automatically selecting certain of said punches for effecting perforations representing serial numbers.

6. In a record perforating machine, means for selectively punching holes in a plurality of columns on a record card and automatically operated means for punching holes representing serial numbers in certain columns of record cards, said last named means being adjustable to variable positions with respect to the columns of the record cards to punch in different columns.

7. In a record perforating machine, means for feeding record cards successively through the machine, means for entering data in the form of perforations upon the cards, automatic means for punching serial numbers in the cards and means for causing interruption of the operation of the serial numbering means during continued feeding of cards through the machine, said numbering means being adapted to resume perforation controlling operations without interruption of the serial numbering.

8. In a perforating machine, a punch carriage, punches mounted in said carriage, means for selectively rendering certain of said punches operative, means for moving said carriage to punching position and means for feeding cards to said carriage including adjustable feeding elements adapted to be moved into operative position for feeding cards to the carriage.

9. In a record perforating machine, means for perforating records including a carriage movable in opposite directions, means for absorbing the shock of movement of the carriage in opposite directions and means actuated by the operation of one of said shock absorbing means for resetting the other of said shock absorbing means.

10. In a record perforating machine, a plurality of rows of punches, a selector associated with each of several rows of said punches, means for causing said punches to perforate records, means controlled by the perforating operation for shifting the positions of said selector, and interconnecting means controlled by one of said selectors for controlling the shifting of an adjacent selector.

11. In a record perforating machine, a punch carriage, punches mounted on said carriage, means for moving said carriage to punching position, and means brought into operation when said carriage reaches punching position for feeding cards to the carriage.

12. In a record perforating machine, a punch carriage, punches mounted on said carriage, means for moving said carriage to punching position, means brought into operation when said carriage reaches punching position for feeding cards to the carriage, means for locking said carriage in punching position during punching operation and means for automatically restoring said carriage to normal position after a punching operation.

13. In a record perforating machine, a punch carriage, punches mounted on said carriage, means for moving said carriage to punching position, means brought into operation when said carriage reaches punching position for feeding cards to the carriage, means for locking said carriage in punching position during punching operation, means for automatically restoring said carriage to normal position after a punching operation, and means for controlling the number of cards fed to the carriage before said restoring operation.

14. In a record perforating machine, a punch carriage, punches mounted on said carriage, means for moving said carriage to punching position, means brought into operation when said carriage reaches punching position for feeding cards to the carriage, means for locking said carriage in punching position during the punching operation, means for automatically restoring said carriage to normal position after a punching operation, means for causing said feeding means to feed a plurality of cards successively to the carriage and additional latching means for preventing movement of said carriage between said successive feeding operations.

15. In a record perforating machine, a plurality of rows of punches, means associated with some of said rows of punches for automatically successively selecting punches for operation for punching serial numbers in records and means for locking one or more of said selecting means against operation.

16. In a record perforating machine, a plurality of rows of punches, manually operable keys for selecting punches in some rows for operation and means for automatically selecting punches in other rows for operation.

17. In a record perforating machine, a plurality of selecting and control keys including an operation initiating key, and means brought into operation by the actuation of said last named key for locking others of the keys against operation irrespective of the subsequent position of said operation initiating key.

18. In a record perforating machine, a plurality of punches, means for selecting punches for operation, latching means operative under control of said selecting means for preserving a punch selection, means for effecting a punching operation for causing a record to be perforated by the selected punches, means for normally rendering said latching means ineffective after a punching operation and means for preventing said latching means from being rendered ineffective if a record is not punched during the punching operation.

19. In a record perforating machine, a plurality of punches, punch selecting means, latching means for preserving a punch selection, means for feeding records to be punched, means for causing records so fed to be punched, means for normally rendering said latching means ineffective at a predetermined point in the operation of the machine, and means for preventing said latching means from being rendered ineffective when the feeding means fails to feed a record.

20. In a record perforating machine having punches and punch selecting means including a carriage, a carriage return device including a winding drum and tape connected to said carriage, means yieldably connected with said drum for actuating the same and differential gear mechanism for controlling the operation of said return device.

21. In a machine of the class described, a carriage movable in one direction to effect a punch set up, means for restoring said carriage in the opposite direction, said means including a drum, a tape connected at one end to said drum and at the other to said carriage, a differential gear driving device having a free part and a part connected to said drum and means for latching the free part to cause operation of the drum to effect the restoration of the carriage.

22. In a machine of the class described, a carriage movable in one direction to effect a punch set up, means for restoring said carriage in the opposite direction, said means including a differential driving device having a free part and a part connected to the carriage and means for stopping said free part to effect the restoration of the carriage.

23. In a record perforating machine, a row of punches, a punch selector comprising a bar having a plurality of projections and a cam adapted to set said bar to cause one of said projections to cooperate with certain of said punches for operation and also adapted to set said bar to cause another of said projections to cooperate with other of said punches for operation.

24. In a punching machine, a column of punches, a selector cooperating with all of said punches, means for positioning said selector relative to said punches, the extent of travel of said selector being less than the distance between the end punches of the said column.

In testimony whereof I hereto affix my signature.

JOHN ROYDEN PEIRCE.